(12) United States Patent
Hirai et al.

(10) Patent No.: US 12,098,226 B2
(45) Date of Patent: Sep. 24, 2024

(54) POLYMER, METHOD FOR PRODUCING POLYMER, AND METHOD FOR PRODUCING MEMBRANE

(71) Applicant: AGC Inc., Tokyo (JP)

(72) Inventors: Takeshi Hirai, Tokyo (JP); Daisuke Jomuta, Tokyo (JP); Chikaya Tamitsuji, Tokyo (JP); Takumi Okuyama, Tokyo (JP)

(73) Assignee: AGC Inc., Tokyo (JP)

( * ) Notice: Subject to any disclaimer, the term of this patent is extended or adjusted under 35 U.S.C. 154(b) by 592 days.

(21) Appl. No.: 17/351,717

(22) Filed: Jun. 18, 2021

(65) Prior Publication Data

US 2021/0332171 A1 Oct. 28, 2021

Related U.S. Application Data

(63) Continuation of application No. PCT/JP2019/049455, filed on Dec. 17, 2019.

(30) Foreign Application Priority Data

Dec. 19, 2018 (JP) .................................. 2018-237168

(51) Int. Cl.
*C08F 214/26* (2006.01)
*B29C 48/00* (2019.01)
(Continued)

(52) U.S. Cl.
CPC .......... *C08F 214/26* (2013.01); *B29C 48/022* (2019.02); *C08J 5/18* (2013.01);
(Continued)

(58) Field of Classification Search
None
See application file for complete search history.

(56) References Cited

U.S. PATENT DOCUMENTS

| 2009/0068544 | A1* | 3/2009 | Ragsdale | H01M 8/1037 429/494 |
| 2013/0065114 | A1* | 3/2013 | Shinohara | C07D 285/36 429/200 |
| 2017/0098845 | A1* | 4/2017 | Kim | C08L 81/06 |

FOREIGN PATENT DOCUMENTS

| CN | 102365266 A | 2/2012 |
| JP | 2011-241344 A | 12/2011 |

(Continued)

OTHER PUBLICATIONS

International Search Report issued Feb. 25, 2020 in PCT/JP2019/049455, filed on Dec. 17, 2019, 3 pages.

(Continued)

*Primary Examiner* — Scott J. Chmielecki
(74) *Attorney, Agent, or Firm* — Element IP, PLC

(57) ABSTRACT

To provide a polymer wherein a linking group that connects the main chain of the polymer and a cyclic perfluoroaliphatic disulfonimide skeleton, is a fluoroalkylene group which may have an ether oxygen atom. A polymer which has either one or both of units represented by formula u1-1 and units represented by formula u1-2:

Formula u1-1

Formula u1-2

(Continued)

$R^{F1}$, $R^{F2}$: a $C_{1-3}$ perfluoroalkylene group; $R^{F3}$: a $C_{1-6}$ perfluoroalkylene group; m: 0 or 1; and X: a hydrogen atom, an alkali metal atom, a fluorine atom, an alkyl group, ammonium or the like.

22 Claims, 1 Drawing Sheet

(51) Int. Cl.
| | |
|---|---|
| B29K 27/12 | (2006.01) |
| B29L 31/00 | (2006.01) |
| C08J 5/18 | (2006.01) |
| C08J 5/22 | (2006.01) |
| C08J 5/24 | (2006.01) |
| H01M 8/10 | (2016.01) |
| H01M 8/1004 | (2016.01) |

(52) U.S. Cl.
CPC ............ *C08J 5/2237* (2013.01); *C08J 5/243* (2021.05); *H01M 8/1004* (2013.01); *B29K 2027/12* (2013.01); *B29L 2031/755* (2013.01); *C08J 2327/18* (2013.01); *H01M 2008/1095* (2013.01); *H01M 2300/0082* (2013.01)

(56) References Cited

FOREIGN PATENT DOCUMENTS

| WO | WO-2017112972 A1 | 7/2017 |
| WO | WO 2019/045063 A1 | 3/2019 |

OTHER PUBLICATIONS

Sukhjinder Singh et al, "N-Fluoroperfluoroalkylsulfonimides. Remarkable new fluorination reagents", J. Am. Chem. Soc., 1987, 109, 23, pp. 7194-7196.

* cited by examiner

POLYMER, METHOD FOR PRODUCING POLYMER, AND METHOD FOR PRODUCING MEMBRANE

This application is a continuation of PCT Application No. PCT/JP2019/049455, filed on Dec. 17, 2019, which is based upon and claims the benefit of priority from Japanese Patent Application No. 2018-237168 filed on Dec. 19, 2018. The contents of those applications are incorporated herein by reference in their entireties.

TECHNICAL FIELD

The present invention relates to a polymer, a method for producing a polymer, and a method for producing a membrane.

BACKGROUND ART

As a polymer having a cyclic perfluoroaliphatic disulfonimide skeleton in a pendant group, a polymer having units based on an imide monomer represented by the following formula (5.4) is disclosed (Patent Document 1).

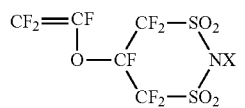
(5.4)

Here, X is a hydrogen atom, an alkali metal, or a cation that forms a salt with 1,3-disulfonimide.

PRIOR ART DOCUMENT

Patent Document

Patent Document 1: JP-A-2011-241344

DISCLOSURE OF INVENTION

Technical Problem

In Patent Document 1, a method for synthesizing the imide monomer of the formula (5.4) and a method for producing the polymer using the imide monomer, i.e. a method for producing a polymer in which the linking group connecting the main chain of the polymer and the cyclic perfluoroaliphatic disulfonimide skeleton is —O—, is described. However, with respect to a polymer in which the linking group connecting the main chain of the polymer and the cyclic perfluoroaliphatic disulfonimide skeleton is other than —O—, e.g. the linking group is a fluoroalkylene group which may have an etheric oxygen atom, it is not clear that a person skilled in the art can produce the polymer based on the description of Patent Document 1 and the common general knowledge as of the filing of the present application.

One embodiment of the present invention is to provide a polymer in which the linking group connecting the main chain of the polymer and a cyclic perfluoroaliphatic disulfonimide skeleton is a fluoroalkylene group which may have an etheric oxygen atom.

Further, another embodiment of the present invention is to provide a new method for producing a polymer having a cyclic perfluoroaliphatic disulfonimide skeleton in a pendant group.

Solution to Problem

The present invention has the following embodiments.
<1> A polymer having either one or both of units represented by the following formula u1-1 and units represented by the following formula u1-2:

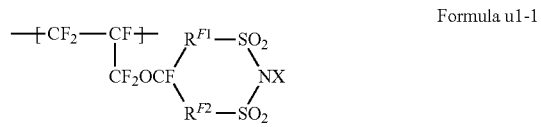
Formula u1-1

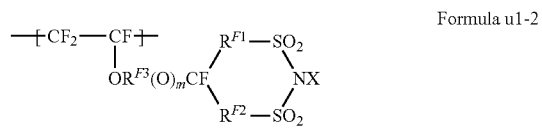
Formula u1-2 where $R^{F1}$ and $R^{F2}$ are each independently a $C_{1-3}$ perfluoroalkylene group, $R^{F3}$ is a $C_{1-6}$ perfluoroalkylene group, m is 0 or 1, and X is a hydrogen atom, an alkali metal, a fluorine atom, a $C_{1-10}$ alkyl group, a group having an etheric oxygen atom between carbon atoms of a $C_{2-10}$ alkyl group, ammonium or phosphonium.

<2> The polymer according to <1>, which further has units based on tetrafluoroethylene.

<3> A liquid composition comprising the polymer as defined in <1> or <2> and a liquid medium.

<4> A membrane comprising the polymer as defined in <1> or <2>.

<5> The membrane according to <4>, which further contains a reinforcing material.

<6> A method for producing a membrane, which comprises applying the liquid composition as defined in <3> to a base material or impregnating it to a reinforcing material, followed by drying.

<7> A polymer electrolyte membrane comprising the polymer as defined in <1> or <2>.

<8> A catalyst layer comprising the polymer as defined in <1> or <2> and a catalyst.

<9> A membrane electrode assembly for a polymer electrolyte fuel cell, comprising
an anode having a catalyst layer,
a cathode having a catalyst layer, and
a polymer electrolyte membrane disposed between the anode and the cathode, in which at least one selected from the group consisting of the catalyst layer of the cathode, the catalyst layer of the anode, and the polymer electrolyte membrane, contains the polymer as defined in <1> or <2>.

<10> A polymer electrolyte fuel cell provided with the membrane electrode assembly as defined in <9>.

<11> A cation exchange membrane for chlor-alkali electrolysis, comprising the polymer as defined in <1> or <2>.

<12> An ion exchange membrane for water electrolysis, comprising the polymer as defined in <1> or <2>.

<13> A separator for a redox flow secondary battery, comprising the polymer as defined in <1> or <2>.

<14> An ion exchange membrane for an electrochemical hydrogen pump, comprising the polymer as defined in <1> or <2>.

<15> A method for producing a polymer, which comprises reacting polymer F having units represented by the following formula u2 with ammonia to obtain polymer Ia having units represented by the following formula u1a:

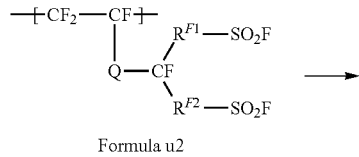

Formula u2

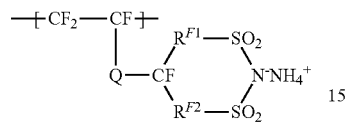

Formula u1a where $R^{F1}$ and $R^{F2}$ are each independently a $C_{1\text{-}3}$ perfluoroalkylene group, Q is —O— or —(O)$_n R^f$(O)$_m$—, $R^f$ is a $C_{1\text{-}10}$ fluoroalkylene group or a group having an etheric oxygen atom between carbon atoms of a $C_{2\text{-}10}$ fluoroalkylene group, m is 0 or 1, and n is 0 or 1.

<16> A method for producing a polymer, which comprises reacting the polymer Ia obtained by the method for producing a polymer as defined in <15>, with a protonic acid, to obtain polymer Ib having units represented by the following formula u1b:

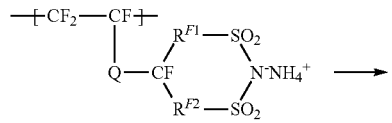

Formula u1a

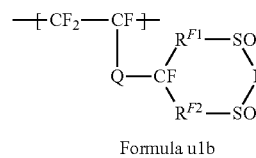

Formula u1b

<17> A method for producing a polymer, which comprises reacting the polymer Ia obtained by the method for producing a polymer as defined in <15> or the polymer Ib obtained by the method for producing a polymer as defined in <16>, with an alkali metal salt, to obtain polymer Ic represented by the following formula u1c:

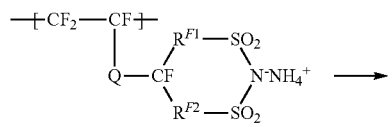

Formula u1a

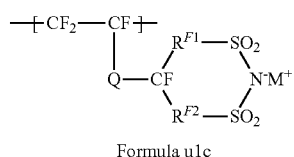

Formula u1c where M is an alkali metal;

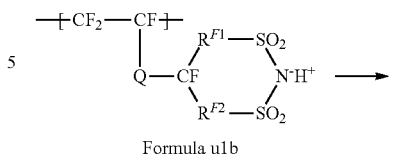

Formula u1b

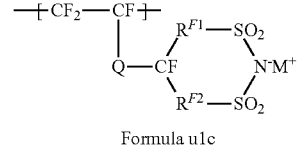

Formula u1c where M is an alkali metal.

<18> A method for producing a polymer, which comprises reacting the polymer Ib obtained by the method for producing a polymer as defined in <16> or the polymer Ic obtained by the method for producing a polymer as defined in <17>, with molecular fluorine, to obtain polymer Id having units represented by the following formula u1d:

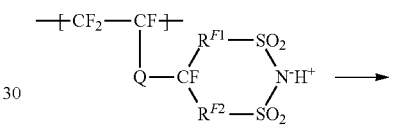

Formula u1b

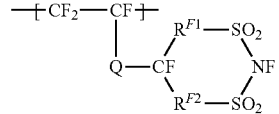

Formula u1d

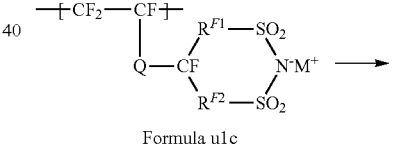

Formula u1c

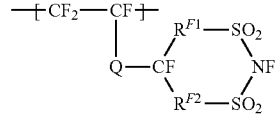

Formula u1d

<19> A method for producing a polymer, which comprises reacting the polymer Ib obtained by the method for producing a polymer as defined in <16>, with an alkylating agent having a $R^{10}$ group, to obtain a polymer Ie having units represented by the following formula u1e:

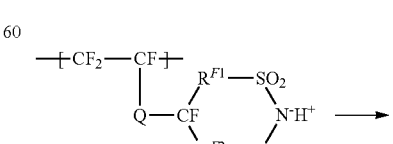

Formula u1b

-continued

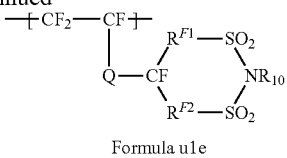

Formula u1e where $R^{10}$ is a $C_{1-10}$ alkyl group, or a group having an etheric oxygen atom between carbon atoms of a $C_{2-10}$ alkyl group.

<20> A method for producing a polymer, which comprises reacting the polymer Ib obtained by the method for producing a polymer as defined in <16>, with a compound represented by the following formula 11, to obtain polymer If having units represented by the following formula u1f:

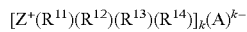

Formula 11

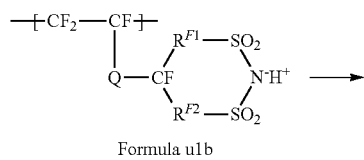

Formula u1b

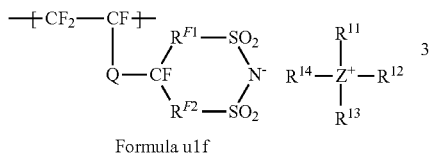

Formula u1f where Z is a nitrogen atom or a phosphorus atom, and $R^{11}$ to $R^{14}$ are each independently a hydrogen atom, a $C_{1-10}$ alkyl group, or a group having an etheric oxygen atom between carbon atoms of a $C_{2-10}$ alkyl group, or $R^{11}$ and $R^{12}$ may form a ring, A may be a k-valent anion, and k may be 1 or 2.

<21> A method for producing a polymer, which comprises reacting the polymer Ie obtained by the method for producing a polymer as defined in <19> with a compound represented by the following formula 12, to obtain polymer Ig having units represented by the following formula u1g:

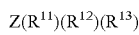

Formula 12

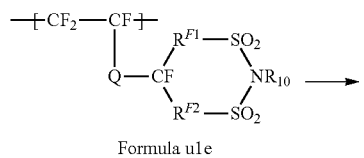

Formula u1e

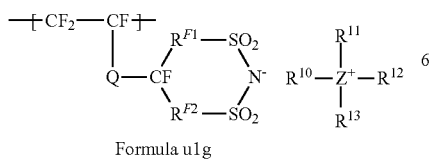

Formula u1g where Z is a nitrogen atom or a phosphorus atom, and $R^{11}$ to $R^{13}$ are each independently a hydrogen atom, a $C_{1-10}$ alkyl group, or a group having an etheric oxygen atom between carbon atoms of a $C_{2-10}$ alkyl group, or $R^{11}$ and $R^{12}$ may form a ring.

<22> The method for producing a polymer according to any one of <15> to <21>, wherein Q is —CF$_2$O—, —OR$^{F3}$(O)$_m$— (where R$^{F3}$ is a $C_{1-6}$ perfluoroalkylene group) or —O—.

<23> The method for producing a polymer according to any one of <15> to <22>, wherein the polymer F further has units based on tetrafluoroethylene.

<24> A method for producing a membrane, which comprises extrusion-molding polymer F having units represented by the following formula u2 into a membrane shape, and then reacting the polymer F with ammonia to obtain a membrane comprising polymer Ia having units represented by the following formula u1a:

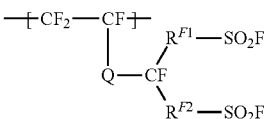

Formula u2

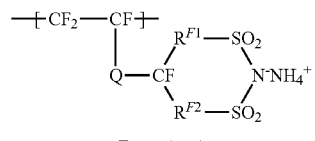

Formula u1a where $R^{F1}$ and $R^{F2}$ are each independently a $C_{1-3}$ perfluoroalkylene group, Q is —O— or —(O)$_n$R$^f$(O)$_m$—, R$^f$ is a $C_{1-10}$ fluoroalkylene group or a group having an etheric oxygen atom between carbon atoms of a $C_{2-10}$ fluoroalkylene group, m is 0 or 1, and n is 0 or 1.

Advantageous Effects of Invention

According to one embodiment of the present invention, it is possible to newly provide a polymer in which the linking group connecting the main chain of the polymer and a cyclic perfluoroaliphatic disulfonimide skeleton is a fluoroalkylene group which may have an etheric oxygen atom.

Further, according to another embodiment of the present invention, it is possible to provide a new method for producing a polymer having a cyclic perfluoroaliphatic disulfonimide skeleton in a pendant group.

According to this new polymer, it is possible to provide an electrolyte material excellent in ionic conductivity, and it is possible to improve the energy efficiency and output density of an energy device such as a fuel cell, chlor-alkali electrolysis, water electrolysis, a redox flow secondary battery, an electrochemical hydrogen pump, a lithium ion battery, a sodium ion battery, etc. Further, it is possible to provide a solid superacid material having a strong acid strength, and to improve the catalytic efficiency of the solid acid catalyst. Further, it is possible to provide a material excellent in antistatic effect, and to improve the antistatic effect and durability of an antistatic film or an antistatic coating applicable to an optical member such as a display or an electronic member such as electron beam lithography. Further, it is possible to provide a polymer excellent in gas separation selectivity, and to improve the separation selectivity of a gas separation membrane or a gas-liquid separation membrane. Further, it is possible to provide a stable polymer having an NF bond, and to provide a solid phase fluorinating agent excellent in separability and recyclability from a reaction solution when used as a fluorinating reagent for an organic compound or an inorganic compound.

DESCRIPTION OF EMBODIMENTS

Figure 1:
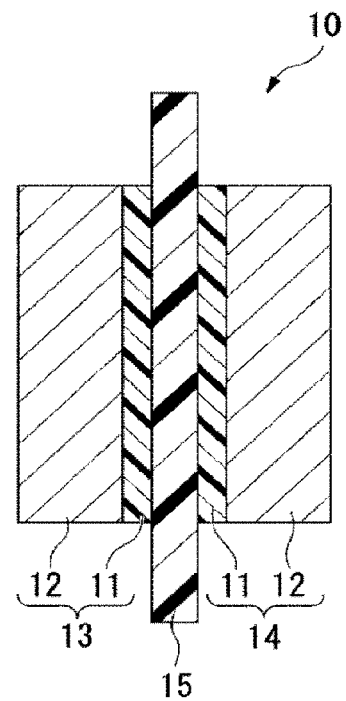
FIG. 1 is a schematic cross-sectional view showing an example of the membrane electrode assembly of the present invention.

In the present specification, a compound represented by the formula 11 will be referred to as compound 11. Compounds represented by other formulas will also be referred to in the same manner.

In the present specification, units represented by the formula u1-1 will be referred to as units u1-1. The structural units represented by other formulas will also be referred to in the same manner.

The following definitions of terms will apply throughout the specification and claims.

A "unit based on a monomer" is a general term for an atomic group directly formed by polymerization of one molecule of the monomer and an atomic group obtainable by chemically converting a part of the atomic group.

A "monomer" is meant for a compound having a polymerization-reactive carbon-carbon double bond.

A "protonic acid" is an acid that supplies $H^+$.

The "volume flow rate value" of a polymer is obtained by the method described in Examples. In this specification, the volume flow rate value will be referred to as "TQ value".

The "glass transition temperature" (hereinafter referred to as "Tg") of a polymer is obtained by the method described in Examples.

The "softening temperature" of a polymer is obtained by the method described in Examples.

The "ion exchange capacity" of a polymer is obtained by the method described in Examples.

The "water uptake" of a polymer is obtained by the method described in Examples.

The "hydrogen gas permeation coefficient" of a polymer is a value obtainable by measuring the hydrogen gas permeation amount of 10% humidification by the isobaric method by setting a membrane made of a polymer to be 80° C. and dividing the permeation amount by the thickness of the membrane.

<Polymer I-1>

One embodiment of the present invention is to provide a polymer (hereinafter referred to also as "polymer I-1") having either one or both of units u1-1 and units u1-2 among polymers (hereinafter referred to also as "polymers I") having a cyclic perfluoroaliphatic disulfonimide skeleton in a pendant group.

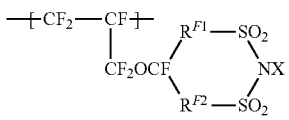

Formula u1-1

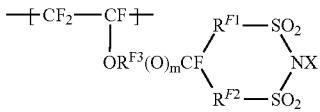

Formula u1-2

Here, $R^{F1}$ and $R^{F2}$ are each independently a $C_{1-3}$ perfluoroalkylene group, $R^{F3}$ is a $C_{1-6}$ perfluoroalkylene group, m is 0 or 1, X is a hydrogen atom, an alkali metal, a fluorine atom, a $C_{1-10}$ alkyl group, a group having an etheric oxygen atom between carbon atoms of a $C_{2-10}$ alkyl group, ammonium or phosphonium. $R^{F1}$ and $R^{F2}$ may be the same or different.

As $R^{F1}$ and $R^{F2}$, for example, —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$— or —$C(CF_3)(CF_3)$— may be mentioned. From such a viewpoint that raw material is less expensive, production of the monomer as the raw material is easy, and the ion-exchange capacity of the polymer I-1 can be made higher, $R^{F1}$ and $R^{F2}$ are preferably a $C_{1-2}$ perfluoroalkylene group, and are preferably a linear perfluoroalkylene group. Specifically, —$CF_2$—, —$CF_2CF_2$— or —$CF(CF_3)$— is preferred, and —$CF_2$— is more preferred.

As $R^{F3}$, for example, —$CF_2$—, —$CF_2CF_2$—, —$CF(CF_3)$—, —$CF_2CF_2CF_2$—, —$CF(CF_2CF_3)$—, —$CF(CF_3)CF_2$—, —$CF_2CF(CF_3)$—, —$C(CF_3)(CF_3)$— or —$CF_2CF(CF_3)OCF_2CF(CF_3)$— may be mentioned. From such a viewpoint that raw material is inexpensive, production of the monomer as the raw material is easy, and the ion exchange capacity of the polymer I-1 can be made higher, $R^{F3}$ is preferably $C_{1-3}$. Specifically, —$CF_2$—, —$CF_2CF_2$— or —$CF_2CF(CF_3)$— is preferred, and —$CF_2CF(CF_3)$— is more preferred.

As the alkali metal for X, lithium, sodium or potassium may be mentioned.

As the $C_{1-10}$ alkyl group, or a group having an etheric oxygen atom between carbon atoms of a $C_{2-10}$ alkyl group, for X, the same one as $R^{10}$ in the polymer Ie as described later, may be mentioned, and the preferred embodiments are also the same.

As the ammonium or phosphonium, the same one as the cation moiety of compound 11 as described later, may be mentioned, and the preferred embodiments are also the same.

As the units u1-1, for example, units u1-1-1 may be mentioned.

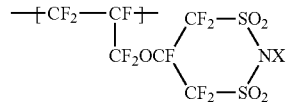

Formula u1-1-1

As the units u1-2, for example, units u1-2-1, units u1-2-2, or units u1-2-3 may be mentioned.

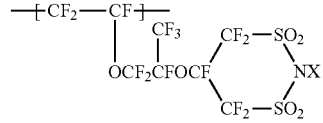

Formula u1-2-1

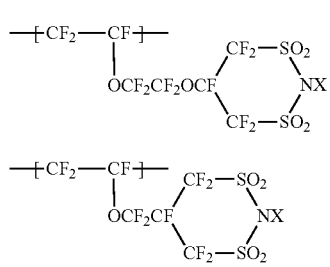

Formula u1-2-2

Formula u1-2-3

It is preferred that the polymer I-1 further has units based on tetrafluoroethylene (hereinafter referred to also as "TFE"). Since TFE has an effect to increase the hydrophobicity of a polymer, it has an effect to suppress swelling when the polymer I-1 contains water, and the water uptake of the polymer I-1 can be reduced. By reducing the water uptake, the mechanical strength becomes high when the polymer electrolyte membrane is formed. Further, when used for a catalyst layer, it is possible to prevent flooding of the polymer electrolyte fuel cell.

The polymer I-1 may further have units based on other monomers other than the units u1-1, the units u1-2 and the units based on TFE.

Other monomers may, for example, be chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (hexafluoropropylene, etc.), a (perfluoroalkyl)ethylene ((perfluorobutyl)ethylene, etc.), a (perfluoroalkyl)propene (3-perfluorooctyl-1-propene, etc.), a perfluoro(alkyl vinyl ether), and a perfluoromonomer having a 5-membered ring as disclosed in WO 2011/013578.

The proportions of the respective units among all units constituting the polymer I-1, may suitably be determined depending on the characteristics and properties (ion exchange capacity, ionic conductivity, mechanical strength, elastic modulus, softening temperature, free volume, gas permeability, water vapor permeability, water diffusivity, transport number, degree of swelling, size of phase-separated structure, dispersed particle size in liquid composition, viscosity of liquid composition, storage modulus of the liquid composition, etc.) required for the polymer I-1 or for the liquid composition or membrane as described later.

The proportion of the units u1-1 or the units u1-2 among all units constituting the polymer I-1, is preferably from 5.0 to 35.0 mol %, more preferably from 10.0 to 30 mol %. Further, the proportion of the units based on TFE is preferably from 65.0 to 95.0 mol %, more preferably from 70.0 to 90.0 mol %.

The ion exchange capacity of the polymer I-1 is preferably from 0.5 to 1.6 meq/g dry resin, more preferably from 0.9 to 1.4 meq/g dry resin. When the ion exchange capacity is at least the lower limit value in the above range, the ionic conductivity of the polymer I becomes high, whereby when used for a polymer electrolyte membrane or a catalyst layer of a polymer electrolyte fuel cell, it is possible to obtain sufficient cell output. Further, when it is used for an ion exchange membrane for chlor-alkali electrolysis or water electrolysis, the overvoltage decreases. When the ion exchange capacity is at most the upper limit value in the above range, the swelling when the polymer I is saturated will be suppressed, and the mechanical strength becomes high when the polymer I is made into a polymer electrolyte membrane. Otherwise, when used as a catalyst layer, it is possible to prevent flooding of the polymer electrolyte fuel cell.

The softening temperature of the polymer I-1 is preferably from 80 to 180° C., more preferably from 100 to 150° C., further preferably from 110 to 130° C. When the softening temperature is at least the lower limit value in the above range, at the time when made into a polymer electrolyte membrane, the mechanical strength at high temperature becomes high. When the softening temperature is at most the upper limit value in the above range, it is possible to make the temperature lower for the annealing treatment of a polymer electrolyte membrane, or for the hot pressing required for the transfer of the catalyst layer, or for the formation of a membrane electrode assembly.

The water uptake of the polymer I-1 is preferably from 30 to 300 mass %, more preferably from 40 to 200 mass %. When the water uptake is at least the lower limit value in the above range, the ionic conductivity of the polymer I-1 becomes high, whereby it is possible to obtain a membrane electrode assembly further excellent in power generation performance. When the water uptake is at most the upper limit value in the above range, the polymer I-1 does not swell excessively with water, whereby it is possible to maintain the mechanical strength of the polymer electrolyte membrane.

The hydrogen gas permeation coefficient of the polymer I-1 under the conditions of a temperature of 80° C. and a relative humidity of 10% is preferably from $1.0 \times 10^{-12}$ to $5.5 \times 10^{-9}$ cm$^3$·cm/(s·cm$^2$·cmHg), more preferably from $5.0 \times 10^{-12}$ to $5.0 \times 10^{-9}$ cm$^3$·cm/(s·cm$^2$·cmHg), further preferably from $8.0 \times 10^{-12}$ to $4.0 \times 10^{-9}$ cm$^3$·cm/(s·cm$^2$·cmHg), particularly preferably from $1.0 \times 10^{-11}$ to $3.0 \times 10^{-9}$ cm$^3$·cm/(s·cm$^2$·cmHg). When the hydrogen gas permeation coefficient is at least the lower limit value in the above range, it is possible to satisfy both the hydrogen gas permeation coefficient and the ionic conductivity. When the hydrogen gas permeation coefficient is at most the upper limit value in the above range, in a case where the polymer I is used for a polymer electrolyte membrane of a polymer electrolyte fuel cell, the amount of hydrogen gas leakage will be reduced, and the fuel consumption rate will thereby be low, and it has an advantage of leading to an improvement in cell voltage. Further, in a case where the polymer I is used for an ion exchange membrane for water electrolysis, the amount of oxygen mixed in the generated hydrogen or the amount of hydrogen mixed in the generated oxygen will be reduced, whereby the safety will be improved. Further, with a thickness thinner as compared with a conventional membrane, it is possible to shield hydrogen equally by the conventional membrane, and it is possible to reduce the electric power consumption rate due to a decrease in the electrolysis voltage or improve the output density. Further, in a case where the polymer I is used for an ion exchange membrane for an electrochemical hydrogen pump, it is possible to prevent the reverse osmosis of compressed hydrogen, whereby it is possible to reduce the electric power consumption rate required for compression.

The polymer I-1 can be produced by the method for producing the polymer I as described later. Specifically, the polymer I-1 can be produced by using polymer F in which Q in the formula u2 described later is —CF$_2$O— or —OR$^{F3}$(O)$_m$—.

<Applications of Polymer I-1>

Applications of the polymer I-1 may, for example, be a polymer contained in a liquid composition for forming a membrane containing a polymer, a polymer (X=hydrogen atom) contained in a catalyst layer or a membrane electrode assembly for a polymer electrolyte fuel cell, a polymer (X=hydrogen atom) contained in a catalyst layer or a polymer electrolyte membrane in a membrane electrode assembly for polymer electrolyte water electrolysis, a polymer (X=alkali metal) contained in a cation exchange membrane to be used for chlor-alkali electrolysis, a polymer (X=hydrogen atom, alkali metal) contained in a cation exchange membrane to be used for electrodialysis, a polymer (X=hydrogen atom) contained in a separator for a redox flow secondary battery, a polymer (X=alkali metal) contained in an ion exchange membrane to be used for alkaline water electrolysis, a polymer (X=hydrogen atom) contained in an ion exchange membrane to be used for a polymer electrolyte water electrolysis, a polymer (X=hydrogen atom) contained in an ion exchange membrane for an electrochemical hydrogen pump, a polymer (X=hydrogen atom, alkali metal) contained in a cation exchange resin to be used for an ion conductive polymer electrolyte actuator or gas sensor, a polymer (X=hydrogen atom) to be used for a solid acid catalyst, a polymer (X=hydrogen atom) to be used for a membrane-type humidity control device such as a dehumidifier or humidifier, a polymer (X=ammonium, phosphonium) to be used for a gas separation membrane, a polymer (X=alkali metal, ammonium, phosphonium) to be used for antistatic coating, a polymer (X=alkali metal, ammonium, phosphonium) contained in an antistatic film, and a recyclable solid phase fluorinating agent (X=fluorine atom).

(Liquid Composition)

The liquid composition of the present invention comprises the polymer I-1 and a liquid medium.

The liquid composition of the present invention may be one having the polymer I-1 dispersed in a liquid medium, or may be one having the polymer I-1 dissolved in the liquid medium.

As the liquid medium, water, an organic solvent, a mixed solvent of water and an organic solvent, etc., may be mentioned, and among them, a mixed solvent of water and an organic solvent is preferred.

Water improves the dispersibility or solubility of the polymer I-1 in the liquid medium.

The organic solvent facilitates the formation of a hardly breakable catalyst layer or polymer electrolyte membrane.

As the organic solvent, from such a viewpoint that it will be easy to form a hardly breakable catalyst layer or polymer electrolyte membrane, at least one type of $C_{1-4}$ alcohols is preferred.

The $C_{1-4}$ alcohols may, for example, be methanol, ethanol, 1-propanol, 2-propanol, 1-butanol, 2,2,2-trifluoroethanol, 2,2,3,3,3-pentafluoro-1-propanol, 2,2,3,3-tetrafluoro-1-propanol, 1,1,1,3,3,3-hexafluoro-2-propanol, and 3,3,3-trifluoro-1-propanol.

In a case where the liquid medium is a mixed solvent, the proportion of water is preferably from 10 to 99 mass %, more preferably from 20 to 99 mass %, in the total of water and the organic solvent.

In a case where the liquid medium is a mixed solvent, the proportion of the organic solvent is preferably from 1 to 90 mass %, more preferably from 1 to 80 mass %, in the total of water and the organic solvent.

When the proportions of water and the organic solvent are within the above ranges, the dispersibility of the polymer I-1 to the dispersion medium will be excellent, and it will be easy to form a hardly breakable catalyst layer or polymer electrolyte membrane.

The concentration of the polymer I-1 in the liquid composition is preferably from 1 to 50 mass %, more preferably from 3 to 30 mass %. When the concentration of the polymer I-1 is at least the lower limit value in the above range, it is possible to obtain a thick film stably during film formation. Further, it becomes easy to adjust the coating liquid for forming a catalyst layer at the time when the catalyst layer is to be prepared. When the concentration of the polymer I-1 is at most the upper limit value in the above range, it is possible to prevent the viscosity of the liquid composition from becoming excessively high.

The liquid composition may contain at least one type of metal, a metal compound, or a metal ion selected from the group consisting of cerium and manganese in order to further improve the durability of the polymer electrolyte membrane and the catalyst layer to be prepared from the liquid composition.

The liquid composition is obtainable by mixing the polymer I-1 and a liquid medium.

The mixing method may, for example, be a method of applying shear such as stirring the polymer I-1 in the liquid medium under atmospheric pressure or in a state of being sealed in an autoclave or the like.

The temperature at the time of stirring is preferably from 0 to 250° C., more preferably from 20 to 150° C. If necessary, shearing by ultrasonic waves or the like may be applied.

At the time of applying shear such as stirring the mixed liquid of the polymer I-1 and the liquid medium, shearing such as stirring may be applied to the mixed liquid having the liquid medium added to the polymer I-1 all at once, or the liquid medium may be mixed with the polymer I-1 dividedly in a plurality of times, and shearing such as stirring may be applied between them. For example, shearing such as stirring, may be applied to a mixed liquid having a part of a liquid medium added to polymer I-1, and then, the remaining liquid medium may be added to the mixed liquid and shearing such as stirring may be applied again. Alternatively, only an organic solvent may be added to the liquid medium and shearing such as stirring may be applied, and then, only water may be added and shearing such as stirring may be applied again.

(Membrane)

The membrane of the present invention comprises the polymer I-1.

The membrane of the present invention may further contain a reinforcing material. The membrane of the present invention may further contain components other than the polymer I-1 and the reinforcing material.

The reinforcing material may, for example, be porous materials, fibers, woven fabrics, and non-woven fabrics. The material for the reinforcing material may be various polymers, and is suitably selected depending on the application of the membrane.

The method for producing the membrane of the present invention may, for example, be a method of applying the liquid composition of the present invention to a base material and drying it (cast method, spin coating method, spray coating method, wipe coating method, squeegee coating method, dip coating method, die coating method, inkjet method, flow coating method, roll coating method, Langmuir-Blodgett method, gravure coating method, etc.); or a method of extrusion molding polymer F, which will be described later, as a precursor of polymer I-1, into a membrane shape, and then reacting the polymer F with ammonia to form a cyclic perfluoroaliphatic disulfonimide skeleton to obtain a membrane comprising polymer Ia, which will be described later, corresponding to polymer I-1. In a case where a membrane having a thickness of at most 100 µm is to be obtained, it is preferred to form the membrane by drying the liquid composition, and in a case where a membrane having a thickness of at least 10 μm is to be obtained, it is preferred to form the membrane by extrusion molding. In a case where a reinforcing material is further contained, a method of impregnating the liquid composition of the present invention to the reinforcing material, followed by drying may be mentioned.

Applications of the membrane of the present invention may, for example, be a catalyst layer or a polymer electrolyte membrane in a membrane electrode assembly for a polymer fuel cell, a catalyst layer or a polymer electrolyte membrane in a membrane electrode assembly for a polymer electrolyte water electrolysis, a cation exchange membrane to be used for chlor-alkali electrolysis or electrodialysis, an ion exchange membrane to be used for water electrolysis, a separator for a redox flow secondary battery, an ion exchange membrane for an electrochemical hydrogen pump, a gas separation membrane, and an antistatic film.

(Membrane Electrode Assembly)

FIG. 1 is a cross-sectional view showing an example of the membrane electrode assembly of the present invention. The membrane electrode assembly 10 is provided with an anode 13 having a catalyst layer 11 and a gas diffusion layer 12, a cathode 14 having a catalyst layer 11 and a gas diffusion layer 12, and a polymer electrolyte membrane 15 which is disposed between the anode 13 and the cathode 14 in a state in contact with the catalyst layers 11.

In the membrane electrode assembly 10, at least one selected from the group consisting of the catalyst layer 11 of the cathode 14, the catalyst layer 11 of the anode 13, and the polymer electrolyte membrane 15, contains the polymer I-1. In a case where the catalyst layer 11 contains the polymer I-1, it is preferred that at least the catalyst layer 11 of the cathode 14 contains the polymer I-1.

The catalyst layer is a layer comprising a catalyst and a polymer having ion exchange groups.

The catalyst may, for example, be a supported catalyst having platinum or a platinum alloy supported on a carbon carrier.

The carbon carrier may, for example, be a carbon black powder.

The polymer having ion exchange groups may, for example, be the polymer I-1 or a perfluoropolymer having ion exchange groups other than the polymer I-1. As the ion exchange groups in the perfluoropolymer having ion exchange groups other than the polymer I-1, sulfonic acid groups, carboxylic acid groups or phosphoric acid groups are preferred, and sulfonic acid groups are particularly preferred. The ion exchange groups (1,3-disulfonimide groups, sulfonic acid groups, etc.) of the polymer contained in the catalyst layer are preferably acid-type ion-exchange groups. Here, the acid-type ion-exchange groups are $SO_2NHSO_2$ groups in the case of the polymer I-1, and acidic groups such as —$SO_3$-$H^+$ groups in the case of a perfluoropolymer having ion exchange groups other than the polymer I-1.

The gas diffusion layer has a function to uniformly diffuse gas into the catalyst layer and a function as a current collector.

As the gas diffusion layer, for example, carbon paper, carbon cloth or carbon felt may be mentioned.

The gas diffusion layer is preferably treated for water-repellency with polytetrafluoroethylene or the like.

Figure 2:
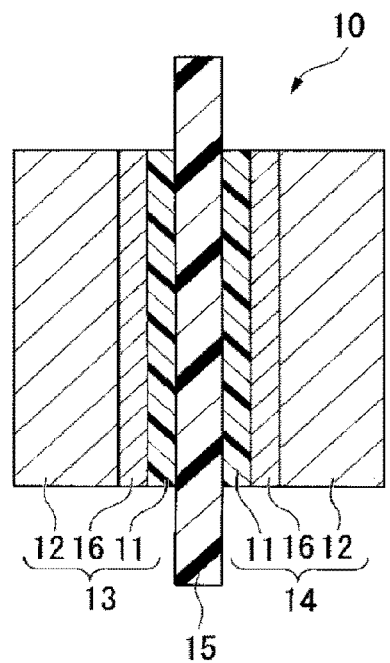
FIG. 2 is a schematic cross-sectional view showing another example of the membrane electrode assembly of the present invention.

As shown in FIG. 2, the membrane electrode assembly 10 may have a carbon layer 16 between the catalyst layer 11 and the gas diffusion layer 12.

By disposing the carbon layer, the gas diffusivity on the surface of the catalyst layer will be improved, and the power generation performance of the polymer electrolyte fuel cell will be substantially improved.

The carbon layer is a layer containing carbon and a nonionic fluorinated polymer.

As the carbon, carbon particles and carbon fibers may be mentioned, and carbon nanofibers having a fiber diameter of from 1 to 1,000 nm and a fiber length of at most 1,000 μm are preferred.

The nonionic fluorinated polymer may, for example, be polytetrafluoroethylene.

The polymer electrolyte membrane is a membrane containing a polymer having ion exchange groups.

The polymer having ion exchange groups may, for example, be the polymer I-1 or a perfluoropolymer having ion exchange groups other than the polymer I-1. As the ion exchange groups in the perfluoropolymer having ion exchange groups other than the polymer I-1, sulfonic acid groups, carboxylic acid groups or phosphoric acid groups are preferred, and sulfonic acid groups are particularly preferred. The total amount of ion exchange groups derived from the polymer I-1 is preferably at least 20%, more preferably at least 50%, particularly preferably at least 80%, to the total amount of ion exchange groups contained in the polymer electrolyte membrane. The above proportion can be adjusted by mixing the polymer I-1 and a perfluoropolymer having ion exchange groups other than polymer I-1 at an optional ratio. The ion exchange groups (1,3-disulfonimide groups, sulfonic acid groups, etc.) of the polymer contained in the polymer electrolyte membrane are preferably an acid type.

The polymer electrolyte membrane may be reinforced with a reinforcing material. The reinforcing material may, for example, be porous materials, fibers, woven fabrics, or non-woven fabrics. The material for the reinforcing material may, for example, be polytetrafluoroethylene, a tetrafluoroethylene-hexafluoropropylene copolymer, a tetrafluoroethylene-perfluoro(alkyl vinyl ether) copolymer, polyethylene, polypropylene, or polyphenylene sulfide.

In order to further improve the durability, the polymer electrolyte membrane may contain at least one type of metal, a metal compound, or a meta ion selected from the group consisting of cerium and manganese. Cerium or manganese will decompose hydrogen peroxide, hydroxyl radicals or hydroperoxyl radicals, which are causative substances that bring about deterioration of the polymer electrolyte membrane. Cerium or manganese is preferably present as ions in the polymer electrolyte membrane, and may be present in any state in the polymer electrolyte membrane so long as it is present as ions. As a method of letting cerium or manganese be contained in the polymer electrolyte membrane, a method of immersing the polymer electrolyte membrane in an aqueous solution containing cerium or manganese, or a method of obtaining the polymer electrolyte membrane from a liquid composition containing cerium or manganese, may be mentioned.

In a case where the membrane electrode assembly does not have a carbon layer, the membrane electrode assembly may be produced, for example, by the following methods.

A method in which catalyst layers are formed on a polymer electrolyte membrane to form a membrane catalyst layer assembly, and the membrane catalyst layer assembly is sandwiched between gas diffusion layers.

A method in which a catalyst layer is formed on a gas diffusion layer to form electrodes (anode, cathode), and a polymer electrolyte membrane is sandwiched between the electrodes.

In a case where the membrane electrode assembly has a carbon layer, the membrane electrode assembly may be produced, for example, by the following methods.

A method in which a dispersion containing carbon and a nonionic fluorinated polymer, is applied on a base film and dried to form a carbon layer, a catalyst layer is formed on the carbon layer, and the catalyst layer and a polymer electrolyte membrane are bonded, whereupon the base film is peeled off to form a membrane catalyst layer assembly having a carbon layer, and the membrane catalyst layer assembly is sandwiched between gas diffusion layers.

A method in which on a gas diffusion layer, a dispersion containing carbon and a nonionic fluorinated polymer, is applied and dried to form a carbon layer, and a membrane catalyst layer assembly having catalyst layers formed on a polymer electrolyte membrane, is sandwiched between gas diffusion layers having a carbon layer.

As the method for forming the catalyst layer, the following methods may be mentioned.

A method in which a coating liquid for forming a catalyst layer is applied on a polymer electrolyte membrane, a gas diffusion layer, or a carbon layer, followed by drying.

A method in which a coating liquid for forming a catalyst layer is applied on a base film and dried to form a catalyst layer, and the catalyst layer is transferred onto a polymer electrolyte membrane.

The coating liquid for forming a catalyst layer is a liquid in which a polymer having ion exchange groups and a catalyst are dispersed in a liquid medium. The coating liquid for forming the catalyst layer may be prepared, for example, by mixing the liquid composition of the present invention and a dispersion of the catalyst. The coating liquid for forming a catalyst layer may contain at least one type of metal, a metal compound, or a metal ion selected from the group consisting of cerium and manganese, in order to further improve the durability of the catalyst layer.

The polymer electrolyte membrane may be formed, for example, by a method (cast method) in which a liquid composition is applied on a base film or a catalyst layer, followed by drying.

The liquid composition is a dispersion in which a polymer having ion exchange groups is dispersed in a mixed solvent containing water and an organic solvent. As the liquid composition, the liquid composition of the present invention may be used.

In order to stabilize the polymer electrolyte membrane, it is preferred to conduct annealing treatment. The temperature for the annealing treatment may depend on the type of a fluorinated polymer having ion exchange groups, but is preferably from 130 to 200° C. When the temperature for the annealing treatment is at least 130° C., the polymer having ion exchange groups will not excessively contain water. When the temperature for the annealing treatment is at most 200° C., it is possible to prevent thermal decomposition of the ion exchange groups.

(Polymer Electrolyte Fuel Cell)

The polymer electrolyte fuel cell of the present invention is provided with the membrane electrode assembly of the present invention.

The polymer electrolyte fuel cell of the present invention may be one in which on both sides of the membrane electrode assembly, separators having grooves formed as gas flow paths are disposed.

The separator may be a separator made of various conductive materials, such as a metal separator, a carbon separator, or a separator made of a material obtained by mixing graphite and a resin.

In a polymer electrolyte fuel cell, power generation is conducted by supplying a gas containing oxygen to the cathode and a gas containing hydrogen to the anode. The membrane electrode assembly can also be applied to a methanol fuel cell in which power generation is conducted by supplying methanol to the anode.

(Cation Exchange Membrane for Chlor-Alkali Electrolysis)

The cation exchange membrane for chlor-alkali electrolysis of the present invention contains the polymer I-1.

The cation exchange membrane for chlor-alkali electrolysis of the present invention may be a laminate of a layer containing the polymer I-1 and a layer containing a polymer having sulfonic acid groups or carboxylic acid groups.

The ion exchange groups (1,3-disulfonimide groups, carboxylic acid groups, etc.) of the polymer contained in the cation exchange membrane for chlor-alkali electrolysis are preferably a salt type. Here, the salt-type ion exchange groups are $SO_2NMSO_2$ groups in the case of the polymer I-1, and organic salt type functional groups such as $—SO_3^- M^+$ groups or $—CO_2^- M^+$ groups in the case of a perfluoropolymer having ion exchange groups other than polymer I-1.

(Ion Exchange Membrane for Water Electrolysis)

The ion exchange membrane for water electrolysis of the present invention contains the polymer I-1.

The ion exchange membrane for water electrolysis of the present invention has a layer containing the polymer I-1 and may be used for each of an ion exchange membrane for alkaline water electrolysis and an ion exchange membrane for polymer electrolyte water electrolysis. The 1,3-disulfonimide groups of the polymer I-1 are preferably a salt type for alkaline water electrolysis and are preferably an acid type for polymer electrolyte water electrolysis.

(Separator for Redox Flow Secondary Battery)

The separator for a redox flow secondary battery of the present invention contains the polymer I-1.

The separator for a redox flow secondary battery of the present invention has a layer containing the polymer I-1. The 1,3-disulfonimide groups in the polymer I-1 are preferably an acid type.

(Ion Exchange Membrane for Electrochemical Hydrogen Pump)

The ion exchange membrane for an electrochemical hydrogen pump of the present invention contains the polymer I-1.

The ion exchange membrane for an electrochemical hydrogen pump of the present invention has a layer containing the polymer I-1. The 1,3-disulfonimide groups in the polymer I-1 are preferably an acid type.

<Method for Producing Polymer I>

Another embodiment of the present invention provides a new method for producing polymer I.

Various polymers I can be derived from a polymer having units u2 (hereinafter referred to also as "polymer F") by the following scheme. Polymer F will be described later.

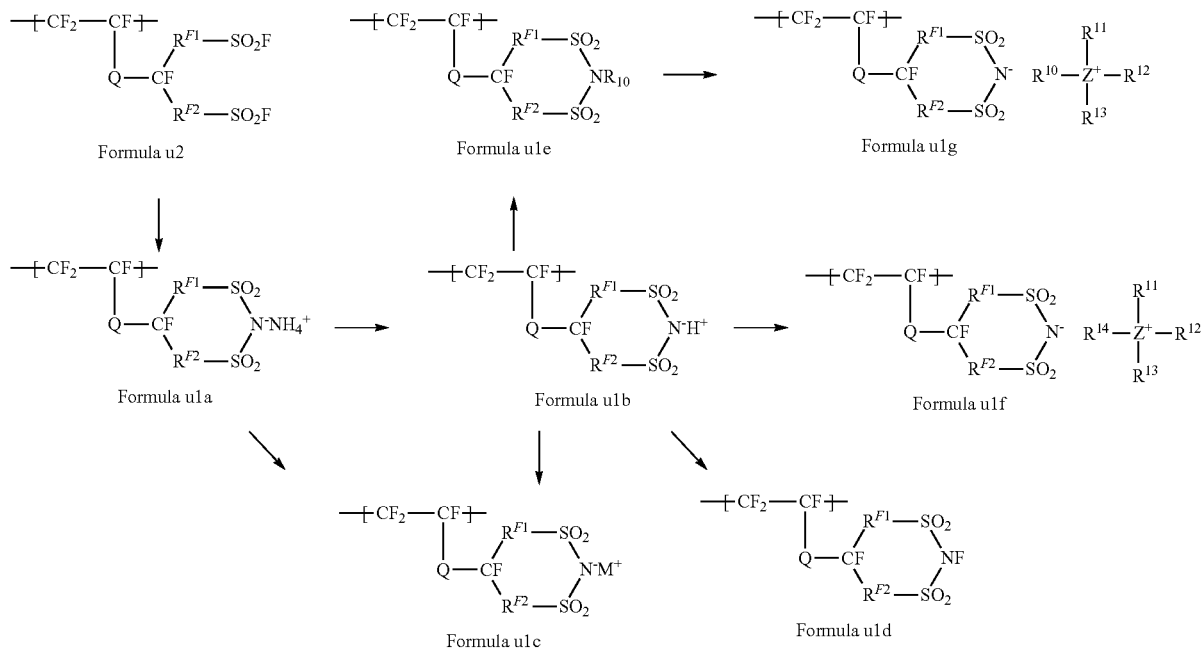

Here, Q is —O— or —(O)$_n$R$^f$(O)$_m$—, R$^f$ is a C$_{1-10}$ fluoroalkylene group or a group having an etheric oxygen atom between carbon atoms of a C$_{2-10}$ fluoroalkylene group, n is 0 or 1, M is an alkali metal, and R$^{10}$ is a C$_{1-10}$ alkyl group or a group having an etheric oxygen atom between carbon atoms of a C$_{2-10}$ alkyl group, Z is a nitrogen atom or a phosphorus atom, R$^{11}$ to R$^{14}$ are each independently a hydrogen atom, a C$_{1-10}$ alkyl group, or a group having an etheric oxygen atom between carbon atoms of a C$_{2-10}$ alkyl group, or R$^{11}$ and R$^{12}$ may form a ring.

As Q, from the viewpoint that the polymer F can be easily produced, —CF$_2$O—, —OR$^{F3}$(O)$_m$— or —O— is preferred.

R$^{F1}$, R$^{F2}$, R$^{F3}$ and m are the same as R$^{F1}$, R$^{F2}$, R$^{F3}$ and m as described for the polymer I-1, and the preferred forms are also the same.

The polymer F having units u2 is reacted with ammonia to obtain a polymer having units u1a (hereinafter referred to also as "polymer Ia").

As the ammonia, anhydrous ammonia gas or liquefied ammonia is preferred. The reaction is preferably carried out in the presence of a solvent. As the solvent, a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.), or a hydrofluoroether (CF$_3$CH$_2$OCF$_2$CF$_2$H, etc.) may be mentioned. Such a case where a solvent having a hydroxy group such as an alcohol or phenol, or water, is not present, is preferred, since it is possible to accelerate the hydrolysis reaction of SO$_2$F groups which the polymer F has, and thereby to prevent inhibiting the desired sulfonimide formation reaction. The reaction temperature is preferably from −80 to 50° C., and the reaction pressure is preferably from −0.09 to 0.9 MPa (gauge pressure).

The polymer Ia is reacted with a protonic acid to obtain a polymer having units u1b (hereinafter referred to also as "polymer Ib"). The protonic acid may, for example, be hydrochloric acid or sulfuric acid.

The polymer Ia or polymer Ib is reacted with an alkali metal salt to obtain a polymer having units u1c (hereinafter referred to also as "polymer Ic"). The alkali metal may, for example, be lithium, sodium or potassium.

The polymer Ib or polymer Ic is reacted with molecular fluorine (F$_2$) to obtain a polymer having units u1d ("polymer Id"). Fluorination may be carried out by a known method.

The polymer Ib is reacted with an alkylating agent having a R$^{10}$ group to obtain a polymer having units u1e (hereinafter referred to as "polymer Ie"). R$^{10}$ is preferably a C$_{1-10}$ alkyl group, more preferably a C$_{1-6}$ alkyl group, particularly preferably a methyl group, an ethyl group or a propyl group. The alkylating agent may, for example, be a trialkyl orthoacetate, a trialkyl orthoformate, an alkyl halide, or a dialkyl sulfuric acid.

The polymer Ib is reacted with compound 11 to obtain a polymer having units u1f ("polymer If"). The reaction is preferably carried out in the presence of a solvent. The solvent may be water, an organic solvent, or a mixed solvent of water and an organic solvent.

$$[Z^+(R^{11})(R^{12})(R^{13})(R^{14})]_k(A)^{k-} \qquad \text{Formula 11}$$

Here, Z, R$^{11}$, R$^{12}$, R$^{13}$ and R$^{14}$ are the same as Z, R$^{11}$, R$^{12}$, R$^{13}$ and R$^{14}$ as described in the scheme in the method for producing the polymer I, A is a k-valent anion, and k is 1 or 2.

As the compound 11, compound 11-1 or compound 11-2 is preferred, compound 11-1 is more preferred, and compound 11-1a or compound 11-1b is particularly preferred.

$$[N^+(R^{11})(R^{12})(R^{13})(R^{14})]_k(A)^{k-} \qquad \text{Formula 11-1}$$

$$[P^+(R^{11})(R^{12})(R^{13})(R^{14})]_k(A)^{k-} \qquad \text{Formula 11-2}$$

-continued

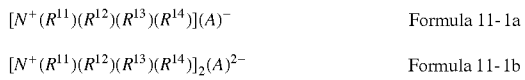

The cation moiety of compound 11 may, for example, be ethylmethylpropylammonium, dimethylethylpropylammonium, N-methyl-N'-ethylimidazolium, N-methyl-N-propylpyrrolidinium, or N-methyl-N-ethylpyrrolidinium.

The monovalent anion moiety of compound 11 may, for example, be a halogen anion, OH—, a hydrogen carbonate anion, or a nitrite anion, and a halogen anion or OH— is preferred. The divalent anion moiety of compound 11 may, for example, be a carbonate anion, a sulfate anion, a sulfite anion, a nitrate anion, a phosphite anion or a phosphate anion, and a carbonate anion or a hydrogen carbonate anion is preferred.

The polymer Ie is reacted with compound 12 to obtain a polymer having units u1g ("polymer Ig"). The reaction is preferably carried out by heating in the presence of a solvent.

Here, Z, $R^{11}$, $R^{12}$ and $R^{13}$ are the same as Z, $R^{11}$, $R^{12}$ and $R^{13}$ as described in the scheme in the method for producing the polymer I.

As the compound 12, compound 12-1 or compound 12-2 is preferred, and compound 12-1 is particularly preferred.

The compound 12 may, for example, be ammonia, methylamine, ethylamine, propylamine, butylamine, dimethylamine, diethylamine, dipropylamine, dibutylamine, methylethylamine, methylpropylamine, methylbutylamine, ethylpropylamine, ethylbutylamine, propylbutylamine, trimethylamine, triethylamine, tripropylamine, methyldiethylamine, dimethylethylamine, triphenylamine, dimethylpropylamine, diethylpropylamine, tributylamine, pyrrolidine, N-propylpyrrolidine, N-ethylpyrrolidine, N-propylpiperidine, imidazole, N-ethyl imidazole, N-butyl imidazole, N-hexyl imidazole, N-octyl imidazole, N-decyl imidazole, N-dodecyl imidazole, N-tetradecyl imidazole, N-hexadecyl imidazole, N-octadecyl imidazole, 1-ethyl-2-methylimidazole, 1-butyl-2-methylimidazole, 1-hexyl-2-methylimidazole, pyridine, pyrimidine, pyridazine, pyrrole, N-methylpyrrole, N-ethylpyrrole, N-propylpyrrole, N-butylpyrrole, piperidine, N-methyl piperidine, N-ethyl piperidine, N-propyl piperidine, N-butyl piperidine, indole, N-methyl indole, N-ethyl indole, N-propyl indole, N-butyl indole, hexamethyleneimine, N-methylhexamethyleneimine, N-ethylhexamethyleneimine, N-propylhexamethyleneimine, N-butylhexamethyleneimine, oxazoline, N-methyloxazoline, N-ethyloxazoline, N-propyloxazoline, N-butyloxazoline, morpholine, N-methylmorpholine, N-ethylmorpholine, N-propylmorpholine, N-butylmorpholine, pyrroline, N-methylpyrroline, N-ethylpyrroline, N-propylpyrroline, N-butylpyrroline, or hexamethylenetetramine.

In order to remove organic substances contained as impurities in the polymer I (polymer Ia to polymer Ig), the polymer I may be immersed in a hydrogen peroxide solution after hydrolysis or conversion to an acid type, to decompose the organic substances.

The polymer I may be in the form of a powder, pellets, or a membrane.

The concentration of hydrogen peroxide in the hydrogen peroxide solution is preferably from 0.1 to 30 mass %, more preferably at least 1 mass % and less than 10 mass %. When the concentration of hydrogen peroxide is at least the lower limit value in the above range, the effect to decompose organic substances will be sufficient. When the concentration of hydrogen peroxide is at most the upper limit value in the above range, the polymer I is less likely to be decomposed.

The temperature of the hydrogen peroxide solution is preferably from 15 to 90° C., more preferably at least 40° C. and lower than 80° C. When the temperature of the hydrogen peroxide solution is at least the lower limit value in the above range, the effect to decompose organic substances will be sufficient. When the temperature of the hydrogen peroxide solution is at most the upper limit value in the above range, hydrogen peroxide is unlikely to be decomposed.

The time for immersing the polymer I in the hydrogen peroxide solution may depend on the thickness of the polymer I and the amount of organic substances contained in the polymer I, but, for example, when the polymer I is a membrane having a thickness of 50 µm, it is preferably at least 0.5 hour and less than 100 hours. When the immersion time is less than 0.5 hour, it will be difficult to decompose organic substances inside the membrane. Even if it is immersed for at least 100 hours, the effect to further decompose organic substances cannot be expected.

It is preferred to wash the polymer I with water after immersing it in the hydrogen peroxide solution. As the water to be used for washing with water, ultrapure water is preferred. Further, conversion to an acid type may be conducted before washing with water.

The preferred ranges of the ion exchange capacity, softening temperature, water uptake, and hydrogen gas permeation coefficient under the conditions of a temperature of 80° C. and a relative humidity of 10%, of the polymer I (polymer Ia to polymer Ig) thus obtainable, are the same as of the polymer I-1.

Further, as the applications of the polymer I (polymer Ia to polymer Ig) thus obtainable are the same applications as of the polymer I-1.

(Polymer F)

Polymer F having units u2 is used as a precursor for polymer I.

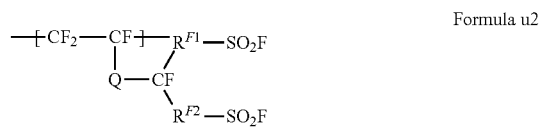

Formula u2

Q, $R^{F1}$ and $R^{F2}$ are the same as Q, $R^{F1}$ and $R^{F2}$ as described in the scheme in the method for producing the polymer I, and the preferred forms are also the same.

The polymer F is preferably one which further has units based on TFE. Since TFE has an effect to increase the hydrophobicity of the polymer, it has an effect to suppress swelling when the polymer I contains water, and the water uptake of the polymer I can be reduced. By reducing the water uptake, the mechanical strength becomes high when made into a polymer electrolyte membrane. Further, when used for a catalyst layer, flooding of the polymer electrolyte fuel cell can be suppressed.

The polymer F may further have units based on other monomers other than the units u2 and the units based on TFE. Other monomers may be the same as those exemplified as other monomers for the polymer I-1.

The proportions of the respective units among all units constituting the polymer F may be suitably determined depending on the characteristics and properties (ion exchange capacity, ionic conductivity, mechanical strength, elastic modulus, softening temperature, free volume, gas permeability, water vapor permeability, water diffusivity, transport number, degree of swelling, size of phase-separated structure, dispersed particle size in liquid composition, viscosity of the liquid composition, storage modulus of the liquid composition) required for the polymer I, or for the liquid composition or the membrane.

The TQ value of the polymer F is preferably from 150 to 450° C., more preferably from 180 to 400° C. When the TQ value of the polymer F is at least the lower limit value in the above range, the polymer I will have a sufficient molecular weight and will be excellent in mechanical strength. When the TQ value of the polymer F is at most the upper limit value in the above range, the solubility or dispersibility of the polymer I will be improved, and a liquid composition can be easily prepared. The TQ value is an index for the molecular weight of the polymer F.

The Tg of the polymer F is preferably from 5 to 70° C., more preferably from 15 to 55° C. When Tg is at least the lower limit value in the above range, the tackiness of the polymer F is suppressed, and the ease of handling and storage stability are improved. When Tg is at most the upper limit value in the above range, brittleness of the pellets or membrane of the polymer F is suppressed.

The polymer F can be produced by polymerizing the monomer components containing a later-described fluorosulfonyl group-containing monomer (hereinafter referred to also as a "SO$_2$F group-containing monomer"), and, as the case requires, TFE and other monomers.

The polymerization method may, for example, be a bulk polymerization method, a solution polymerization method, a suspension polymerization method, or an emulsion polymerization method. Further, the polymerization may be conducted in a liquid or supercritical carbon dioxide.

The polymerization is carried out under such a condition that radicals are generated. The method for generating radicals may, for example, be a method of irradiating radiation such as ultraviolet rays, γ-rays or electron beams, or a method of adding a radical initiator.

The polymerization temperature is preferably from 10 to 250° C., more preferably from 120 to 230° C., further preferably from 140 to 200° C., particularly preferably from 147 to 168° C.

The radical initiator may, for example, be a bis(fluoroacyl) peroxide, a bis(perfluoroalkyl) peroxide, a bis(chlorofluoroacyl) peroxide, a dialkyl peroxydicarbonate, a dialkyl peroxide, a peroxyester, an azo compound, or a persulfate. From such a viewpoint that a polymer F having few unstable terminal groups can be obtained, a bis(fluoroacyl) peroxide, a bis(perfluoroalkyl) peroxide, or a dialkyl peroxide is preferred.

As the solvent to be used in the solution polymerization method, a solvent having a boiling point of from 20 to 350° C. is preferred, and a solvent having a boiling point of from 40 to 150° C. is more preferred. The solvent may, for example, be a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.), or a hydrofluoroether (CF$_3$CH$_2$OCF$_2$CF$_2$H, etc.).

In the solution polymerization method, a monomer, a radical initiator, etc. are added to the solvent, and radicals are generated in the solvent to polymerize the monomer. The addition of the monomer and the radical initiator may be a batch addition, an intermittent addition, or a continuous addition.

In the suspension polymerization method, it is preferred that water is used as a liquid medium, a monomer, a nonionic radical initiator, etc. are added to the liquid medium, and radicals are generated in the obtained dispersion medium to polymerize the monomer.

The nonionic radical initiator may, for example, be a bis(fluoroacyl) peroxide, a bis(chlorofluoroacyl) peroxide, a dialkyl peroxydicarbonate, a diacyl peroxide, a peroxyester, a dialkyl peroxide, a bis(fluoroalkyl) peroxide, or an azo compound.

To the dispersion medium, for example, an organic solvent as an auxiliary agent, a surfactant as a dispersion stabilizer to prevent aggregation of suspended particles, and a hydrocarbon compound (hexane, methanol, etc.) as a molecular weight adjuster, may be added.

In the emulsion polymerization method, a monomer is polymerized by emulsifying the monomer in water in the presence of an emulsifier and a polymerization initiator. As the emulsifier and the polymerization initiator, reagents which are commonly used in the usual emulsion polymerization of perfluoropolymers, may be used. For example, as the emulsifier, it is possible to use an ammonium salt of a perfluorocarboxylic acid, such as CF$_3$CF$_2$CF$_2$CF$_2$OCF$_2$COONH$_4$ or CF$_3$CF$_2$OCF$_2$CF$_2$OCF$_2$COONH$_4$. As the polymerization initiator, a radical initiator such as a peroxide, an azo compound or a persulfate, may be used. Further, the initiator may be used as activated by a redox reaction of metal ions, etc. Further, in addition to them, a buffering agent, a chain transfer agent, etc. which are commonly used in the usual emulsion polymerization for perfluoropolymers, may be suitably used. Further, in order to increase the reaction rate of the fluorinated monomer, a mixed solution of an aqueous solvent and the fluorinated monomer may be forcibly emulsified by using a homogenizer, a pressure emulsifier or the like, before the start of polymerization.

(SO$_2$F Group-Containing Monomer)

As the SO$_2$F group-containing monomer as a raw material for the polymer F, from such a viewpoint that the production is easy, compound 7, compound 8 or compound 9 is preferred, and compound 7 is particularly preferred.

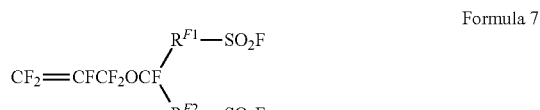

Formula 7

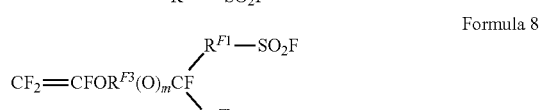

Formula 8

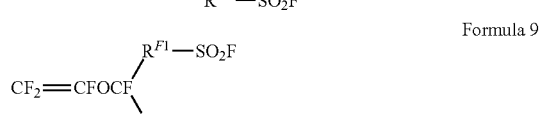

Formula 9

$R^{F1}$, $R^{F2}$, $R^{F3}$ and m are the same as $R^{F1}$, $R^{F2}$, $R^{F3}$ and m as described for the polymer I-1, and the preferred forms are also the same.

The compound 7 may, for example, be compound 7-1.

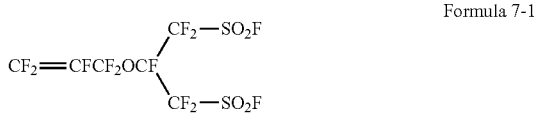

Formula 7-1

The compound 8 may, for example, be compound 8-1, compound 8-2, or compound 8-3.

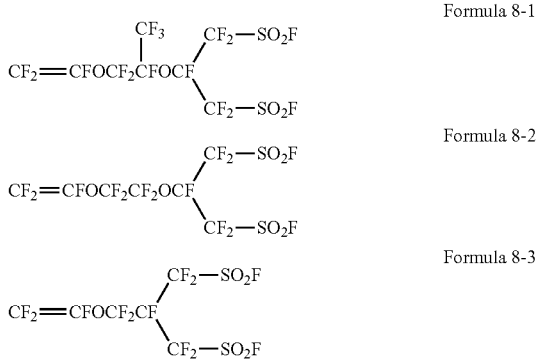

Formula 8-1

Formula 8-2

Formula 8-3

The compound 9 may, for example, be compound 9-1.

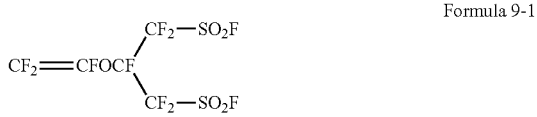

Formula 9-1

As the $SO_2F$ group-containing compound useful as an intermediate for the compound 7, the compound 8 or the compound 9, compound 4 or compound 5 may be mentioned.

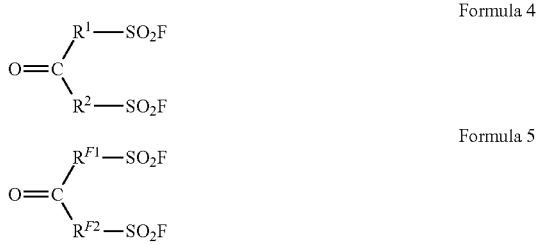

Formula 4

Formula 5

Here, $R^1$ and $R^2$ are each independently a $C_{1-3}$ alkylene group. $R^1$ and $R^2$ may be the same or different.

As $R^1$ and $R^2$, for example, —$CH_2$—, —$CH_2CH_2$—, —$CH(CH_3)$—, —$CH_2CH_2CH_2$—, —$CH(CH_2CH_3)$—, —$CH(CH_3)CH_2$—, —$CH_2CH(CH_3)$—, or —$C(CH_3)(CH_3)$— may be mentioned. From such a viewpoint that raw material compound 1 is cheaper, production of compound 5 is easy, and the ion exchange capacity of the polymer I can be made higher, $R^1$ and $R^2$ are preferably $C_{1-2}$ alkylene groups, and preferably straight chains. Specifically, —$CH_2$—, —$CH_2CH_2$— or —$CH(CH_3)$— is preferred, and —$CH_2$— is more preferred.

$R^{F1}$ and $R^{F2}$ are the same as $R^{F1}$ and $R^{F2}$ as described for the polymer I-1, and the preferred forms are also the same.

Compound 4 and compound 5 can be produced as follows.

Compound 1 is reacted with a sulfonating agent to obtain compound 2, compound 2 is reacted with a chlorinating agent to obtain compound 3, compound 3 is reacted with a fluorinating agent to obtain compound 4, and compound 4 is subjected to fluorination treatment to obtain compound 5.

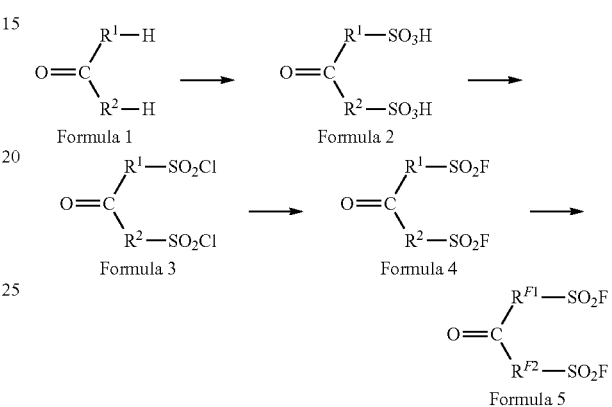

Formula 1

Formula 2

Formula 3

Formula 4

Formula 5

$R^1$ and $R^2$ are the same as $R^1$ and $R^2$ as described for the compound 4, and the preferred forms are also the same.

$R^{F1}$ and $R^{F2}$ are the same as $R^{F1}$ and $R^{F2}$ as described for the polymer I-1, and the preferred forms are also the same.

The compound 1 may, for example, be acetone, methyl ethyl ketone, diethyl ketone, methyl propyl ketone, ethyl propyl ketone, dipropyl ketone, diisopropyl ketone, isopropyl methyl ketone, isopropyl ethyl ketone or isopropyl propyl ketone, and acetone is preferred from such a viewpoint that the compound 1 is cheaper, the production of the compound 5 is easy, and the ion exchange capacity of the sulfonic acid group-containing polymer per unit molecular weight can be made higher.

The sulfonating agent may, for example, be chlorosulfonic acid, fluorosulfonic acid, sulfur trioxide, a complex of sulfur trioxide, fuming sulfuric acid, or concentrated sulfuric acid.

The reaction temperature of the compound 1 and the sulfonating agent is preferably from 0 to 100° C. The reaction solvent can be suitably selected from solvents in which the solvents themselves are less likely to be sulfonated. The reaction solvent may, for example, be methylene chloride, chloroform, carbon tetrachloride, 1,1,1-trichloromethane, cyclohexane, hexane, petroleum ether, pentane, heptane, diethyl ether, acetonitrile, or a carbonate ester such as diethyl carbonate. As the reaction solvent, two or more types may be used as mixed.

The chlorinating agent may, for example, be thionyl chloride, phosphorus pentachloride, phosphorus trichloride, phosphoryl chloride, chlorosulfonic acid, sulfuryl chloride, or oxalyl chloride.

The reaction temperature of the compound 2 and the chlorinating agent is preferably from 0 to 100° C. When the reaction temperature is at most the upper limit value in the above range, the decomposition of the compound 3 can be suppressed, so that the yield of the compound 3 is improved.

When the reaction temperature is at least the lower limit value in the above range, the reaction rate is increased, and the productivity is improved.

The fluorinating agent may, for example, be potassium hydrogen fluoride, sodium hydrogen fluoride, potassium fluoride, sodium fluoride, cesium fluoride, silver fluoride, a quaternary ammonium fluoride (tetraethylammonium fluoride, tetrabutylammonium fluoride, etc.), hydrogen fluoride, hydrofluoric acid, or a hydrogen fluoride complex (HF-pyridine complex, HF-triethylamine, etc.).

The reaction temperature of the compound 3 and the fluorinating agent is preferably from −30 to 100° C. The reaction solvent can be suitably selected from polar solvents or low polar solvents that are less susceptible to the fluorination reaction. The reaction solvent may, for example, be methylene chloride, chloroform, carbon tetrachloride, 1,1,1-trichloromethane, diethyl ether, dioxane, tetrahydrofuran, dimethoxyethane, diethylene glycol dimethyl ether, tetraethylene glycol dimethyl ether, dimethyl sulfoxide, sulfolane, N,N-dimethylformamide, acetonitrile, dimethyl carbonate, diethyl carbonate, ethylene carbonate, propylene carbonate or water. As the reaction solvent, two or more types may be used as mixed.

The fluorination treatment is carried out by bringing the compound 4 into contact with a fluorine gas or a fluorine compound.

The fluorine compound may, for example, be hydrogen fluoride, a halogen fluoride (chlorine trifluoride, iodine pentafluoride, etc.), a gaseous fluoride (boron trifluoride, nitrogen trifluoride, phosphorus pentafluoride, silicon tetrafluoride, sulfur hexafluoride, etc.), a metal fluoride (lithium fluoride, nickel fluoride (II), etc.), a hypofluorite compound (trifluoromethylhypofluorite, trifluoroacetylhypofluorite, etc.), or an electrophilic fluoride reaction reagent (Selectfluor (registered trademark), N-fluorobenzenesulfonimide, etc.).

As the fluorination treatment, a treatment in which the compound 4 and the fluorine gas are brought into contact with each other is preferred from the viewpoint of easy handling and reduction of impurities contained in the compound 5. Fluorine gas may be diluted with an inert gas such as nitrogen gas before use. The temperature of the fluorination treatment is preferably from −20 to 350° C. The reaction solvent may be suitably selected from solvents having high solubility of the compound 4 or the compound 5 and solvents themselves being less susceptible to the fluorination treatment. The reaction solvent may, for example, be acetonitrile, chloroform, dichloromethane, trichlorofluoromethane, a perfluorotrialkylamine (perfluorotributylamine, etc.), a perfluorocarbon (perfluorohexane, perfluorooctane, etc.), a hydrofluorocarbon (1H,4H-perfluorobutane, 1H-perfluorohexane, etc.), a hydrochlorofluorocarbon (3,3-dichloro-1,1,1,2,2-pentafluoropropane, 1,3-dichloro-1,1,2,2,3-pentafluoropropane, etc.), or a hydrofluoroether ($CF_3CH_2OCF_2CF_2H$, etc.).

The compound 7 can be produced by reacting the compound 5 with a perfluoroallylating agent. As the perfluoroallylating agent, compound 6 may be mentioned.

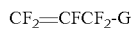
$CF_2$=$CFCF_2$-G                 Formula 6

Here, G is —$OSO_2F$, —$OSO_2R^{f2}$, a chlorine atom, a bromine atom or an iodine atom, and $R^{f2}$ is a $C_{1-8}$ perfluoroalkyl group.

As the compound 6, compound 6-1 is preferred from the viewpoint of availability of raw material, reactivity of the perfluoroallylating agent, ease of synthesis, and ease of handling.

$CF_2$=$CFCF_2OSO_2F$             Formula 6-1

The compound 6-1 can be produced, for example, by reacting hexafluoropropylene with sulfur trioxide in the presence of boron trifluoride. Instead of boron trifluoride, a boron trifluoride diethyl ether complex or a Lewis acid such as trimethoxyborane may be used.

The reaction of the compound 5 with the perfluoroallylating agent is preferably carried out in the presence of a fluoride salt. The fluoride salt may, for example, be potassium fluoride, cesium fluoride, silver fluoride, quaternary ammonium fluoride, or sodium fluoride.

The reaction temperature of the compound 5 and the perfluoroallylating agent is preferably from −70 to 40° C. The reaction solvent preferably contains an aprotic polar solvent, and more preferably, it is made of only an aprotic polar solvent. The aprotic polar solvent may, for example, be monoglime, diglime, triglime, tetraglime, acetonitrile, propionitrile, adiponitrile, benzonitrile, dioxane, tetrahydrofuran, N,N-dimethylformamide, dimethyl sulfoxide, N-methylpyrrolidone, or nitroethane. As the reaction solvent, two or more types may be used as mixed.

Compound 8-1 as the compound 8 and compound 9-1 as the compound 9 can be produced by adding hexafluoropropylene oxide to the compound 5-1 in the presence of a catalytic amount of a metal fluoride (potassium fluoride, cesium fluoride, etc.) to obtain compound 10-1a and compound 10-1b, and then thermally decomposing the compound 10-1b and the compound 10-1a.

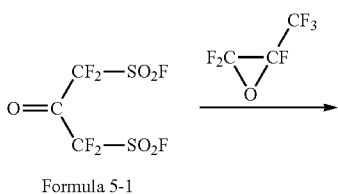

Formula 5-1

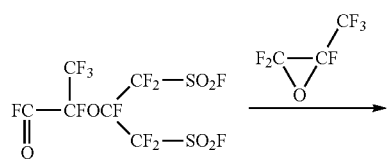

Formula 10-1a

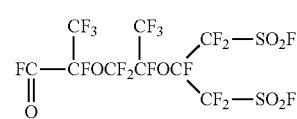

Formula 10-1b

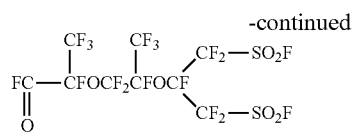

Formula 10-1b

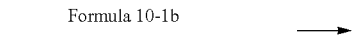

Formula 10-1a

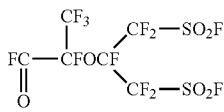

Formula 8-1

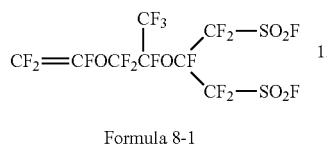

Formula 9-1

As the compound 8, compound 8-2 can be produced as follows. By reacting 1 mol of the compound 5-1 with an equivalent amount of a metal fluoride, tetrafluoroethylene, and iodine, compound 10-2 is obtained. The compound 10-2 is reacted with fuming sulfuric acid to obtain compound 10-3. In the presence of a catalytic amount of a metal fluoride, 1 mol of hexafluoropropylene oxide is added to 1 mol of the compound 10-3 to obtain compound 10-4, and then the compound 10-4 is thermally decomposed.

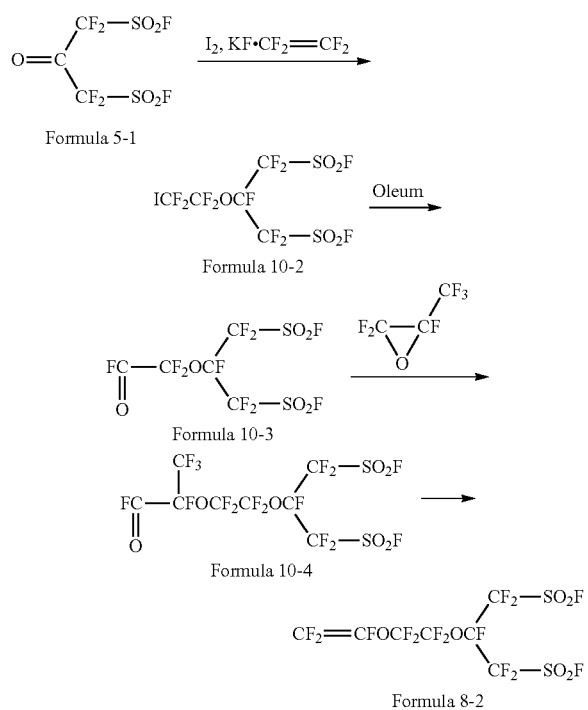

As the compound 8, compound 8-3 can be produced as follows. By reacting 1 mol of compound 5-1 with 1 mol of a difluorocarbene generator such as hexafluoropropylene oxide, compound 10-5 is obtained. In the presence of a catalytic amount of a metal fluoride, 1 mol of hexafluoropropylene oxide is added to 1 mol of the compound 10-5 to obtain compound 10-6, and then the compound 10-6 is thermally decomposed.

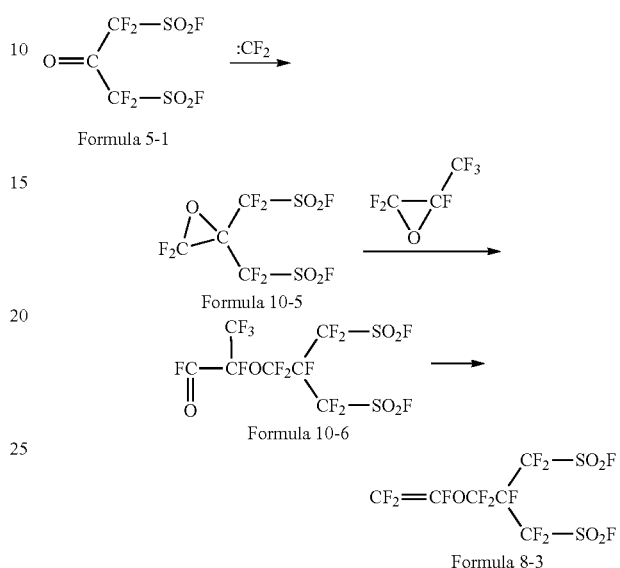

EXAMPLES

Hereinafter, the present invention will be specifically described with reference to Examples, but the present invention is not limited to these Examples.

Ex. 1 and 2 are Production Examples, Ex. 3 to 10 are Examples of the present invention, and Ex. 11 is a Comparative Example.

($^1$H-NMR)

$^1$H-NMR was measured under the conditions of frequency: 300.4 MHz and chemical shift standard: tetramethylsilane. Unless otherwise specified, $CD_3CN$ was used as the solvent. The quantification of a product was carried out from the analysis result of $^1$H-NMR and the amount of the internal standard sample (1,3-bis(trifluoromethyl)benzene) added.

($^{19}$F-NMR)

$^{19}$F-NMR was measured under the conditions of frequency: 282.7 MHz, solvent: $CD_3CN$, and chemical shift standard: $CFCl_3$. The quantification of a product was carried out from the analysis result of $^{19}$F-NMR and the amount of the internal standard sample (1,3-bis(trifluoromethyl)benzene) added.

($^{13}$C-NMR)

$^{13}$C-NMR was measured under the conditions of frequency: 75.5 MHz and chemical shift standard: tetramethylsilane. Unless otherwise specified, $CD_3CN$ was used as the solvent.

(Yield)

Yield means the yield of the reaction step×the yield of the purification step, and the reaction yield means only the yield of the reaction step before purifying the target product, which does not include the loss in the purification step.

(Ion Exchange Capacity)

A membrane of the polymer F was vacuum dried at 120° C. for 12 hours. After measuring the mass of the membrane of the polymer F after the drying, the membrane of the polymer F was immersed in a 0.85 mol/g aqueous sodium hydroxide solution (solvent: water/methanol=10/90 (mass ratio)) at 60° C. for 72 hours, to hydrolyze $SO_2F$ groups. The aqueous sodium hydroxide solution after the hydrolysis was back titrated with 0.1 mol/L hydrochloric acid to obtain the ion exchange capacity (meq/g dry resin) of the polymer F.

Assuming that two $SO_2F$ groups in the polymer F were quantitatively converted to one 1,3-disulfonimide group, the ion exchange capacity of the polymer I was obtained by calculation from the ion-exchange capacity of the polymer F.
(Proportion of Units Based on $SO_2F$ Group-Containing Monomer)

The proportion of units based on a $SO_2F$ group-containing monomer in the polymer F was calculated from the ion exchange capacity of the polymer F.
(TQ Value)

Using a flow tester (CFT-500A, manufactured by Shimadzu Corporation) equipped with a nozzle having a length of 1 mm and an inner diameter of 1 mm, the polymer F was melt-extruded while changing the temperature under the condition of an extrusion pressure of 2.94 MPa. The temperature (TQ value) at which the extrusion amount of the polymer F became 100 $mm^3$/sec was obtained. In a case where the TQ value exceeded 300° C., the TQ value was obtained by extrapolating from the measured value of the extrusion amount of at most 300° C. The extrapolation was performed by a logarithmic approximation of the correlation of extrusion amount with respect to the reciprocal of absolute temperature. The higher the TQ, the higher the molecular weight of the polymer.
(Dynamic Viscoelasticity Measurement)

With respect to a membrane of the polymer F or a membrane of the polymer I, using a dynamic viscoelasticity measuring device (manufactured by IT Keisoku Seigyo K.K., DVA-225), the dynamic viscoelasticity measurement was performed under the conditions of sample width: 5.0 mm, grip length: 15 mm, measurement frequency: 1 Hz, temperature rise rate: 2° C./min, and tension mode. From the ratio (E"/E') of loss modulus E" and storage modulus E', tan δ (tangent loss) was calculated, and a tan δ-temperature curve was prepared. The value obtained by reading the peak temperature between −100 and 200° C. from the tan δ-temperature curve was taken as Tg of the polymer F or the softening temperature of the polymer I. Further, a storage modulus E'-temperature curve was prepared, and the value obtained by reading the storage modulus at 120° C. was taken as the 120° C. storage modulus of the polymer I.
(Conductivity)

A substrate in which 4-terminal electrodes are disposed at 5 mm intervals was brought into close contact with a membrane of the polymer I having a thickness of 50 μm and a width of 5 mm, and by a known 4-terminal method, the resistance of the membrane of the polymer I was measured under constant temperature and humidity conditions of a temperature of 80° C. and a relative temperature of 50%, at AC: 10 kHz and voltage: 1 V, whereby the conductivity (S/cm) was calculated.
(Water Uptake)

A membrane of the polymer I was immersed in warm water at 80° C. for 16 hours and then cooled until the water temperature became at most 25° C. The membrane of the polymer I was taken out, the water adhering to the surface of the membrane was wiped off with a filter paper, and the mass W1 of the membrane of the polymer I was measured. After the membrane of the polymer I was dried in a glove box in a nitrogen atmosphere for at least 48 hours, the mass W2 of the membrane of the polymer I was measured in the glove box. The water uptake (mass %) was obtained from the following formula i.

$$\text{Water uptake}=(W1-W2)/W2\times100 \quad \text{Formula i}$$

(Hydrogen Gas Permeation Coefficient)

With respect to a membrane containing the polymer I, the hydrogen gas permeation coefficient was measured in accordance with JIS K 7126-2: 2006. As a measuring device, a gas permeability measuring device (GTR-100 XFAG, manufactured by GTR TEC Corporation) was used. A membrane having an effective permeation area of 9.62 $cm^2$ was kept at 80° C., hydrogen gas having the relative humidity adjusted to be 10% was permitted to flow on the first surface at 30 mL/min, and argon gas having the relative humidity adjusted to be 10% was permitted to flow on the second surface at 30 mL/min, whereby the hydrogen gas permeating to the argon gas was detected by gas chromatography, and the hydrogen gas permeation amount in terms of volume at 25° C. and 1 atm, was measured. Using the obtained hydrogen gas permeation amount, the flow rate of gas permeating per second per 1 $cm^2$ of the membrane area per 1 cmHg of the pressure difference of the permeated gas, was obtained, and the value converted to a 1 cm thick membrane was taken as the hydrogen gas permeation coefficient ($cm^3 \cdot cm/(s \cdot cm^2 \cdot cmHg)$).
(Test for Initial Power Generation Characteristics)

A membrane electrode assembly was incorporated into a cell for power generation, the temperature of the membrane electrode assembly was maintained at 80° C., hydrogen gas (utilization rate 70%) to the anode, and air (utilization rate 50%) to the cathode, were supplied, respectively, as pressurized to 151 kPa (absolute pressure). The humidity of the gas was 100% RH for both hydrogen and air, and the cell voltage at the time when the current density was 2 $A/cm^2$, was recorded. The higher the cell voltage, the better the power generation characteristics of the polymer electrolyte fuel cell.
(Abbreviations)
PFtBPO: $(CF_3)_3COOC(CF_3)_3$,
tBPO: $(CH_3)_3COOC(CH_3)_3$,
HFC-52-13p: $CF_3(CF_2)_5H$,
HFE-347pc-f: $CF_3CH_2OCF_2CF_2H$.

Ex. 1

Ex. 1-1

Into a 2 L four-necked flask equipped with a stirrer, a condenser, a thermometer and a dropping funnel, 560 g of chlorosulfonic acid was charged under nitrogen gas sealing. The flask was cooled in an ice bath, and while keeping the internal temperature to be at most 20° C., a mixed solution of 139.5 g of compound 1-1 and 478.7 g of dichloromethane was added dropwise over 20 minutes. During the dropwise addition, heat generation and gas generation were observed. After completion of the dropwise addition, the flask was set in an oil bath, and while keeping the internal temperature at from 30 to 40° C., the reaction was conducted for 7 hours. The reaction proceeded with the generation of gas, and a white solid was precipitated. After the reaction, the pressure inside the flask was reduced, and dichloromethane was distilled off. A yellowish white solid remained in the flask. When the solid was analyzed by $^1$H-NMR, it was confirmed that compound 2-1 was formed.

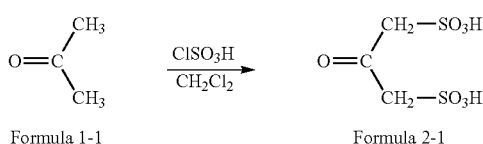

Formula 1-1    Formula 2-1

NMR spectrum of compound 2-1:
$^1$H-NMR (solvent: D$_2$O): 4.27 ppm (—CH$_2$—, 4H, s).
$^{13}$C-NMR (solvent: D$_2$O): 62.6 ppm (—CH$_2$—), 195.3 ppm (C=O).

Ex. 1-2

The compound 2-1 obtained in Ex. 1-1 was used as it was, in the next reaction, without being isolated. Into the flask in Ex. 1-1, 2,049 g of thionyl chloride was added. The flask was heated to 80° C. and refluxed for 15 hours. As the reaction proceeded, the reflux temperature increased from 52° C. to 72° C. During the reaction, gas generation was confirmed. The point at which the compound 2-1 was completely dissolved and the generation of gas subsided, was taken as the reaction end point. The reaction solution was transferred to a 2 L separable flask and left to cool for 9 hours while sealing the gas phase with nitrogen gas, whereby a dark brown solid was precipitated in the separable flask. Unreacted thionyl chloride was removed by decantation. Toluene was added to wash the precipitated solid, and the toluene was removed again by decantation. Toluene washing was carried out a total of 3 times, and the total amount of toluene used was 1,207 g. The precipitated solid was dried at 25° C. for 71 hours under a nitrogen gas stream. The solid after the drying was recovered and analyzed by $^1$H-NMR, and it was confirmed that 356.5 g of compound 3-1 having a purity of 96.2% was obtained. The yield based on the compound 1-1 became 56.0%.

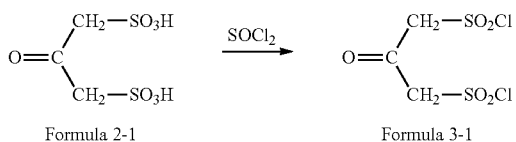 [SMILES: O=C(CS(=O)(=O)O)CS(=O)(=O)O ; "SOCl2" ; O=C(CS(=O)(=O)Cl)CS(=O)(=O)Cl]

Formula 2-1    Formula 3-1

NMR spectrum of compound 3-1:
$^1$H-NMR: 5.20 ppm (—CH$_2$—, 4H, s).
$^{13}$C-NMR: 72.3 ppm (—CH$_2$—), 184.6 ppm (C=O).

Ex. 1-3

Into a 1 L four-necked flask equipped with a stirrer, a condenser and a thermometer, 90.0 g of the compound 3-1 and 750 mL of acetonitrile were charged under nitrogen gas sealing. The flask was cooled in an ice bath, and 110.3 g of potassium hydrogen fluoride was added with stirring. Heat generation associated with the addition was slight. The ice bath was changed to a water bath, and the reaction was carried out for 62 hours while maintaining the internal temperature to be at from 15 to 25° C. Along with the reaction, a fine white solid was formed. The reaction solution was transferred to a pressure filter, and unreacted potassium hydrogen fluoride and the product were separated by filtering. Acetonitrile was added to the filter, the separated solid was washed until the filtrate became transparent, and the washing solution was recovered. By applying the filtrate and the washing solution to an evaporator, acetonitrile was distilled off. To the solid remaining after the drying, 950 mL of toluene was added, and the mixture was heated to 100° C. to dissolve the solid in toluene. The dissolved liquid was filtered by gravity filtration to remove undissolved components. The filtrate was transferred to a 1 L separable flask and left to cool for 14 hours while sealing the gas phase with nitrogen gas, whereby light brown needle-like crystals were precipitated in the separable flask. The crystals were washed with toluene and dried at 25° C. for 30 hours under a nitrogen gas stream. The dried solid was recovered and analyzed by $^1$H-NMR and $^{19}$F-NMR, whereby it was confirmed that 58.1 g of compound 4-1 having a purity of 97.6% was obtained. The yield based on the compound 3-1 was 72.3%.

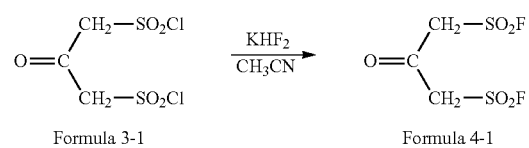 [SMILES: O=C(CS(=O)(=O)Cl)CS(=O)(=O)Cl ; "CH3CN" ; "KHF2" ; O=C(CS(=O)(=O)F)CS(=O)(=O)F]

Formula 3-1    Formula 4-1

NMR spectrum of compound 4-1:
$^1$H-NMR: 4.97 ppm (—CH$_2$—, 4H, d, J=3.1 Hz).
$^{19}$F-NMR: 62.4 ppm (—SO$_2$F, 2F, t, J=3.1 Hz).
$^{13}$C-NMR: 60.7 ppm (—CH$_2$—), 184.9 ppm (C=O).

Ex. 1-4

Into a 200 mL nickel autoclave, 9.93 g of the compound 4-1 and 89.7 g of acetonitrile were charged. The autoclave was cooled, nitrogen gas was fed at a flow rate of 6.7 L/hr while maintaining the internal temperature to be at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 6.7 L/hr over 6 hours. Nitrogen gas was fed again at a flow rate of 6.7 L/hr, and the reaction solution was bubbled for 1 hour. 103.2 g of the reaction solution was recovered from the autoclave. The reaction solution was quantitatively analyzed by $^{19}$F-NMR, whereby it was confirmed that compound 5-1 was contained in an amount of 8.4 mass %. The reaction yield based on the compound 4-1 became 66%.

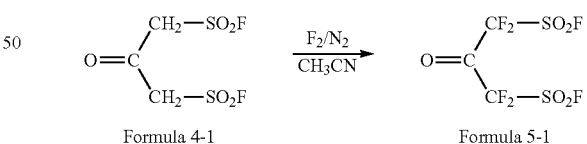

Formula 4-1    Formula 5-1

NMR spectrum of compound 5-1:
$^{19}$F-NMR: −104.1 ppm (—CF$_2$—, 4F, s), 45.8 ppm (—SO$_2$F, 2F, s).

Ex. 1-5

Into a 200 mL nickel autoclave, 19.9 g of the compound 4-1 and 85.6 g of acetonitrile were charged. The autoclave was cooled, nitrogen gas was fed at a flow rate of 6.7 L/hr while maintaining the internal temperature to be at from 0 to 5° C., and the reaction solution was bubbled for 1 hour. While maintaining the temperature of the reaction solution at from 0 to 5° C., a mixed gas of fluorine gas and nitrogen gas (mixing ratio=10.3 mol %/89.7 mol %) was introduced at a flow rate of 16.4 L/hr over 6.5 hours. Nitrogen gas was fed again at a flow rate of 6.7 L/hr, and the reaction solution was bubbled for 1 hour. From the autoclave, 109.6 g of the reaction solution containing compound 5-1 was recovered.

Ex. 1-6

Into a 200 mL nickel autoclave, 20.1 g of the compound 4-1 and 80.1 g of acetonitrile were charged. The autoclave was cooled, nitrogen gas was fed at a flow rate of 6.7 L/hr while maintaining the internal temperature to be at from 0 to 5° C., and the reaction solution was bubbled for 1 hour. While maintaining the temperature of the reaction solution at from 0 to 5° C., a mixed gas of fluorine gas and nitrogen gas (mixing ratio=20.0 mol %/80.0 mol %) was introduced at a flow rate of 8.4 L/hr over 6 hours. Nitrogen gas was fed again at a flow rate of 6.7 L/hr, and the reaction solution was bubbled for 1 hour. From the autoclave, 107.1 g of the reaction solution containing compound 5-1 was recovered.

Ex. 1-7

Into a 50 mL four-necked flask equipped with a stirrer, a condenser, a thermometer and a dropping funnel, 1.65 g of potassium fluoride and 7.8 mL of diethylene glycol dimethyl ether (diglyme) were charged. The flask was cooled in an ice bath, stirred, and while maintaining the internal temperature to be at from 0 to 10° C., 8.43 g of the reaction solution obtained in Ex. 1-4 was added dropwise by using a plastic syringe. Strong heat generation was confirmed, and it took 15 minutes for the dropwise addition. After completion of the dropwise addition, the ice bath was replaced with a water bath, and the reaction was carried out at from 15 to 20° C. for 1 hour. The mixture was cooled again in an ice bath, and 6.56 g of compound 6-1 was added dropwise from a dropping funnel while maintaining the temperature of the reaction solution at from 0 to 10° C. After completion of the dropwise addition, the ice bath was replaced with a water bath, and the reaction was conducted at from 20 to 25° C. for 3.5 hours. A by-product solid was removed from the reaction solution by suction filtration, and the filtrate was collected. The filtered residual solid was washed with an appropriate amount of acetonitrile, and the washing liquid was mixed with the filtrate. 37.1 g of the filtrate was quantitatively analyzed by $^{19}$F-NMR, whereby it was confirmed that compound 7-1 was contained in an amount of 2.04 mass %. The reaction yield based on the compound 4-1 became 46.6%.

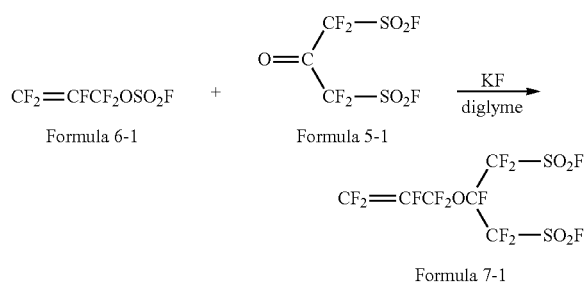

Formula 6-1    Formula 5-1

Formula 7-1

NMR spectrum of compound 7-1:
$^{19}$F-NMR: −191.5 ppm ($CF_2$=CF—, 1F, ddt, J=116, 38, 14 Hz), −133.8 ppm (—O—CF—, 1F, tt, J=21.3, 6.1 Hz), −103.1 ppm (—$CF_2$—$SO_2F$, 4F, m), −101.5 ppm ($CF_2$=CF—, 1F, ddt, J=116, 49, 27 Hz), −87.6 ppm ($CF_2$=CF—, 1F, ddt, J=49, 38, 7 Hz), −67.5 ppm (—$CF_2$—O—, 2F, m), 46.8 ppm (—$SO_2F$, 2F, s).

Ex. 1-8

Into a 500 mL four-necked flask equipped with a stirrer, a condenser, a thermometer and a dropping funnel, 36.6 g of potassium fluoride and 125.6 g of acetonitrile were charged. The flask was cooled in an ice bath and stirred to keep the internal temperature to be at from 0 to 10° C., and 79.8 g of the reaction solution obtained in Ex. 1-5 was added dropwise by using a plastic dropping funnel. Strong heat generation was confirmed, and it took 23 minutes for the dropwise addition. After completion of the dropwise addition, the ice bath was replaced with a water bath, and the reaction was carried out at from 20 to 30° C. for 5.5 hours. The mixture was cooled again in an ice bath, and 146.0 g of compound 6-1 was added dropwise from the dropping funnel while maintaining the temperature of the reaction solution at from 0 to 10° C. After completion of the dropwise addition, the ice bath was replaced with a water bath and the reaction was conducted at from 15 to 25° C. for 16 hours. Suction filtration was performed in the same manner as in Ex. 1-7, and 412.3 g of the obtained filtrate was quantitatively analyzed by $^{19}$F-NMR, whereby it was confirmed that compound 7-1 was contained in an amount of 3.93 mass %. The reaction yield based on the compound 4-1 was 55.9%. The filtrate was distilled under reduced pressure to isolate the compound 7-1 as a fraction having a boiling point of 97.2° C./10 kPa. The gas chromatography purity was 98.0%.

Ex. 1-9

Into a 50 mL four-necked flask equipped with a stirrer, a condenser, a thermometer and a dropping funnel, 3.70 g of potassium fluoride and 10.9 g of acetonitrile were charged. The flask was cooled in an ice bath and stirred, and 10.2 g of the reaction solution obtained in Ex. 1-6 was added dropwise by using a plastic syringe while keeping the internal temperature to be at from 0 to 10° C. Strong heat generation was confirmed, and it took 8 minutes for the dropwise addition. After completion of the dropwise addition, the ice bath was replaced with a water bath, and the reaction was carried out at from 20 to 30° C. for 3 hours. The mixture was cooled again in an ice bath, and 14.6 g of compound 6-1 was added dropwise from the dropping funnel while maintaining the temperature of the reaction solution at from 0 to 10° C. After completion of the dropwise addition, the ice bath was replaced with a water bath, and the reaction was carried out at from 15 to 25° C. for 17 hours. Suction filtration was performed in the same manner as in Ex. 1-7, and 55.9 g of the obtained filtrate was quantitatively analyzed by $^{19}$F-NMR, whereby it was confirmed that compound 7-1 was contained in an amount of 4.77 mass %. The reaction yield based on the compound 4-1 became 69.6%. The reaction yield based on the compound 1-1 (reaction yield in the entire monomer synthesis step) became 28.2%.

Ex. 2

Ex. 2-1

Into an autoclave (internal volume 100 mL, made of stainless steel), 103.0 g of the compound 7-1 was put, cooled with liquid nitrogen, and degassed. Into the autoclave, TFE was introduced and heated in an oil bath until the internal temperature reached 100° C. The pressure at that time was 0.20 MPa (gauge pressure), and the partial pressure of TFE was 0.29 MPa (absolute pressure). A mixed solution of 105.8 mg of PFtBPO as a polymerization initiator and 6.46 g of HFC-52-13p was injected into the autoclave. Further, nitrogen gas was introduced from the injection line, and the injecting liquid in the injection line was completely pushed in. As a result of dilution of TFE in the gas phase by this operation, the pressure increased to 0.60 MPa (gauge pressure). TFE was continuously added and polymerized while maintaining the pressure at 0.60 MPa (gauge pressure). When the amount of TFE added reached 3.84 g in 12.5 hours, the inside of the autoclave was cooled to stop the polymerization, and the gas in the system was purged. After diluting the reaction solution with HFC-52-13p, HFE-347pc-f was added to precipitate the polymer, followed by filtration. Then, the operation of stirring the polymer in HFC-52-13p and reprecipitating it by HFE-347pc-f, was repeated twice. By vacuum drying at 120° C., 7.61 g of polymer F-1 as a copolymer of TFE and compound 7-1, was obtained. The results are shown in Table 1.

Ex. 2-2 to 2-3

The respective conditions in Ex. 2-1 were changed as shown in Table 1. tBPO was used as the polymerization initiator. After introducing nitrogen gas while heating to a predetermined polymerization temperature, TFE having the pressure as shown in Table 1 was charged to attain the polymerization pressure. Instead of injecting the polymerization initiator in the initial batch, in Ex. 2-2, a 0.20 mass % solution of tBPO dissolved in compound 7-1, and in Ex. 2-3, a 0.05 mass % of tBPO dissolved in the compound 7-1, were added intermittently from the injection line at the start of polymerization and every 30 minutes (the total amount of the polymerization initiator and the compound 7-1 added is shown in Table 1). Other than that, in the same manner as in Ex. 2-1, polymer F-2 to polymer F-3 were obtained. The results are shown in Table 1.

TABLE 1

|  | Ex. 2-1 | Ex. 2-2 | Ex. 2-3 |
|---|---|---|---|
| Obtained polymer F | F-1 | F-2 | F-3 |
| Volume of reactor [mL] | 100 | 100 | 100 |
| Compound 7-1 [g] | 103.0 | 119.4 | 75.9 |
| HFC-52-13p [g] | 6.46 | — | — |
| Polymerization initiator | PFtBPO | tBPO | tBPO |
| Amount of polymerization initiator [mg] | 105.8 | 18.8 | 2.95 |
| Polymerization temperature [° C.] | 100 | 150 | 160 |
| TFE partial pressure [MPa] | 0.29 | 0.51 | 0.47 |
| Polymerization pressure [MPaG] | 0.60 | 0.80 | 0.85 |
| Continuously added TFE [g] | 3.84 | 15.24 | 4.83 |
| Polymerization time [h] | 12.5 | 8.0 | 10.0 |
| Yield of polymer F [g] | 7.61 | 29.9 | 10.2 |
| Ion exchange capacity of polymer F [meq/g dry resin] | 2.37 | 2.24 | 2.36 |
| Units based on compound 7-1 [mol %] | 20.0 | 18.2 | 19.9 |
| Units based on compound 7-1 [mass %] | 52.6 | 49.6 | 52.4 |
| TQ value [° C.] | 158 | 301 | 381 |
| Tg [° C.] | 33 | 35 | 33 |

Ex. 3

Ex. 3-1

2.0 g of the polymer F-1 obtained in Ex. 2-1 was put together with 198.0 g of HFC-52-13p, into a 0.2 L autoclave equipped with a thermometer and a stirrer, and stirred at 80° C. for 3 hours to prepare a solution. After cooling the solution, the autoclave was opened, and dissolution of the polymer F-1 was confirmed. The solution was a colorless and transparent liquid. After closing the autoclave again, the autoclave was immersed in a dry ice/ethanol bath and cooled with stirring at a rate of 200 rpm. After the internal temperature dropped to −30° C., the gas phase of the autoclave was sucked by a vacuum pump, and the internal pressure was reduced to −0.04 MPa (gauge pressure). Then, 2.35 g of ammonia gas was introduced into the gas phase. Introduction of ammonia gas was conducted while adjusting the speed so that the internal temperature would not exceed −15° C., and during this period, the internal temperature was controlled to be at from −30° C. to −20° C. The internal pressure at this time increased to 0 MPa (gauge pressure). After finishing the introduction of ammonia gas, the cooling of the autoclave was finished. When the temperature rose to 5° C., nitrogen gas was introduced into the gas phase to increase the internal pressure to 0.49 MPa (gauge pressure). Then, the reaction was continued at 25° C. for 15 hours. Ammonia gas was purged, and the internal pressure of the container was returned to atmospheric pressure. When the autoclave was opened, it was confirmed that a white polymer (polymer having units u1a-1, "polymer Ia-1") was precipitated in the solution. The precipitated polymer was recovered by suction filtration, and the polymer was washed with HFC-52-13p. The polymer was washed 3 times with 3N hydrochloric acid, further washed 3 times with ultrapure water, and then dried, to obtain 1.8 g of a white polymer (polymer having units u1 b-1 (hereinafter referred to also as "polymer Ib-1").

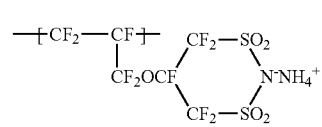

Formula u1a-1

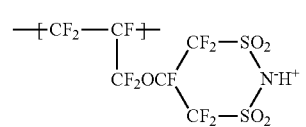

Formula u1b-1

The obtained white polymer was analyzed by infrared spectroscopy, whereby it was confirmed that the peak derived from $SO_2F$ groups in the vicinity of 1,467 $cm^{-1}$ which polymer F-1 has, completely disappeared, and instead, peaks derived from $SO_2NHSO_2$ groups in the vicinity of 1,350 $cm^{-1}$, 1,085 $cm^{-1}$ and 1,036 $cm^{-1}$ appeared. Further, a peak in the vicinity of 1,385 $cm^{-1}$ derived from $SO_2NH_2$ groups and a peak in the vicinity of 1,060 $cm^{-1}$ derived from $SO_3H$ groups were not confirmed. That is, it was confirmed that the polymer Ib-1 in which the $SO_2F$ groups were quantitatively converted to the $SO_2NHSO_2$ groups, was formed. When it is assumed that $SO_2F$ groups which polymer F-1 had, were quantitatively converted to 1,3-disulfonimide groups, the ion exchange capacity of the polymer Ib-1 becomes to be 1.22 meq/g dry resin.

Ex. 3

Ex. 3-2 to Ex. 3-3

Polymers F-2 to F-3 were treated in the same manner as in Ex. 3-1 to obtain polymers Ib-2 to Ib-3. It was confirmed by the infrared spectroscopic analysis that the conversion proceeded quantitatively in each polymer. The ion exchange capacities of the polymers Ib-2 and Ib-3 are shown in Table 2.

Ex. 4

Ex. 4-1

To 1.6 g of the polymer Ib-1, 11.5 g of ethanol and 2.8 g of water were added, and the mixture was heated at 80° C. with stirring. After stirring for 1 hour, the mixture was left to cool and filtered by pressure filtration (filter paper: manufactured by ADVANTEC TOYO KAISHA LTD., PF040) to obtain 15 g of a liquid composition (hereinafter referred to also as "liquid composition S-1") in which the polymer Ib-1 was dispersed at 10.0 mass % in a mixed solvent of ethanol and water. The viscosity at 25° C. at a shear rate of $76.6s^{-1}$ was measured by using an E-type viscometer, whereby it was 80 mPa·s.

Ex. 4-2 to Ex. 4-3

The polymers Ib-2 to Ib-3 were treated in the same manner as in Ex. 4-1 to obtain liquid compositions S-2 to S-3 as shown in Table 2. In the liquid composition S-2, the concentration was 19.3 mass %, and the mass ratio of the solvents was ethanol/water=47/53. In the liquid composition S-3, the concentration was 9.2 mass %, and the mass ratio of the solvents was ethanol/water=50/50.

Ex. 5

Ex. 5-1

The liquid composition S-1 was coated on a 100 μm ethylene-tetrafluoroethylene copolymer sheet by a die coater to form a membrane, followed by drying for 30 minutes in a drying oven at 110° C. Then, it was heat-treated for 30 minutes in a drying oven at 180° C. The control of the thickness of the membrane was conducted by adjusting the thickness of the liquid film of the applied liquid composition. As a result, a polymer electrolyte membrane having a thickness of 50 μm made of the polymer Ib-1 was formed. The results are shown in Table 2.

Ex. 5-2 to Ex. 5-3

In the same manner as in Ex. 5-1 except that the liquid compositions S-2 to S-3 obtained in Ex. 4-2 to Ex. 4-3 were used, polymer electrolyte membranes having a thickness of 50 μm, made of the polymer Ib-2 and the polymer Ib-3, were, respectively, formed. The results are shown in Table 2.

TABLE 2

|  | Ex. 5-1 | Ex. 5-2 | Ex. 5-3 |
|---|---|---|---|
| Polymer I | Ib-1 | Ib-2 | Ib-3 |
| Ion exchange capacity of polymer I [meq/g dry resin] | 1.22 | 1.15 | 1.21 |
| Liquid composition used | S-1 | S-2 | S-3 |
| Softening temperature [° C.] | 121 | 117 | 120 |
| Conductivity [S/cm] | 0.065 | 0.060 | 0.063 |
| Water uptake [mass %] | 162 | 82 | 72 |
| Hydrogen gas permeation coefficient [$cm^3$-cm/ (s-$cm^2$-cmHg)] | $2.7 \times 10^{-9}$ | $2.6 \times 10^{-9}$ | $2.7 \times 10^{-9}$ |

Ex. 6

1.0 g of a membrane of the polymer Ib-1 was immersed in 200 mL of a 1N aqueous lithium hydroxide solution at 90° C. for 16 hours to conduct ion exchange. The membrane was taken out, washed with ultrapure water three times, and then dried to obtain a membrane of polymer Ic-1 having units u1c-1 (M=lithium atom). When analyzed by infrared spectroscopic analysis, peaks 1,037, 1,089 and 1,353 $cm^{-1}$ derived from $SO_2N^-Li^+SO_2$ groups were confirmed.

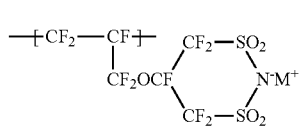

Formula u1c-1

Ex. 7

1.0 g of a membrane of the polymer Ib-1 was immersed in 200 mL of a 1N aqueous sodium hydroxide solution at 90° C. for 16 hours to conduct ion exchange. The membrane was taken out, washed with ultrapure water three times, and then dried to obtain a membrane of polymer Ic-1 having units u1c-1 (M=sodium atom). When analyzed by infrared spectroscopic analysis, peaks 1,036, 1,088, and 1,355 $cm^{-1}$ derived from $SO_2N^-Na^+SO_2$ groups were confirmed.

Ex. 8

1.0 g of a membrane of the polymer Ib-1 was immersed in 200 mL of a 1N aqueous potassium hydroxide solution at 90° C. for 16 hours to conduct ion exchange. The membrane was taken out, washed with ultrapure water three times, and then dried to obtain a membrane of polymer Ic-1 having units u1c-1 (M=potassium atom). When analyzed by infrared spectroscopic analysis, peaks 1,037, 1,088, and 1,353 $cm^{-1}$ derived from $SO_2N^-K^+SO_2$ groups were confirmed.

Ex. 9

1.0 g of a membrane of the polymer Ib-1 was immersed in 200 mL of a 1N aqueous ammonium hydroxide solution at 90° C. for 16 hours to conduct ion exchange. The membrane was taken out, washed with ultrapure water three times, and then dried to obtain a membrane of polymer If-1 having units u1f-1. When analyzed by infrared spectroscopic analysis, peaks 1,035, 1,086 and 1,345 $cm^{-1}$ derived from $SO_2N^-NH_4^+SO_2$ groups and peaks 1,430 and 3,260 $cm^{-1}$ derived from ammonium ions were confirmed.

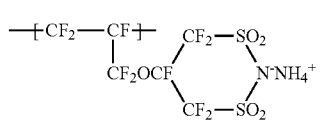

Formula u1f-1

Ex. 10

Ex. 10-1

By the method described in Example 8 (ion exchange resin solution AV1) of Japanese Patent No. 6468475, a liquid composition (solid content concentration=28.0 mass %, ethanol/water=60/40 (mass ratio)) was obtained in which an acid-type sulfonic acid group-containing fluorinated polymer having an ion exchange capacity of 1.25 meq/g dry resin was dispersed. The liquid composition was applied on an ethylene-tetrafluoroethylene copolymer sheet by a die coater while adjusting the coating amount of the liquid composition so that the membrane thickness became to be 25 μm, dried at 80° C., and further heat-treated at 160° C. for 30 minutes to obtain an electrolyte membrane for cell evaluation having a thickness of 25 μm.

To 3.0 g of a supported catalyst (manufactured by Tanaka Kikinzoku Kogyo Co., Ltd., trade name: TEC10E50E) in which 50 mass % of platinum was supported on carbon powder, 19.8 g of water, 12.65 g of ethanol, and 5.86 g of liquid composition S-2 were added and uniformly dispersed in a planetary bead mill at 300 rpm for 90 minutes. To this, 4.13 g of water and 6.20 g of ethanol were added, and further subjected to a planetary bead mill at 300 rpm over 90 minutes to obtain a coating liquid for forming a cathode catalyst layer having a solid content of 8 mass %. The coating liquid for forming a cathode catalyst layer was applied on the above electrolyte membrane for cell evaluation by an applicator, dried at 80° C., and further heat-treated at 160° C. for 30 minutes, to prepare an electrolyte membrane with a cathode catalyst layer in which the amount of platinum was 0.2 mg/cm$^2$.

By the method described in Ex. 4 of JP-A-2018-55877, liquid composition S-4 (solid content concentration=26.0 mass %, ethanol/water=60/40 (mass ratio)) was obtained in which an acid-type sulfonic acid group-containing fluorinated polymer having an ion exchange capacity of 1.1 meq/g dry resin was dispersed.

117 g of water was added to 20.0 g of a supported catalyst (manufactured by Tanaka Kikinzoku Kogyo Co., Ltd., trade name: TEC10E50E) in which 50 mass % of platinum was supported on carbon powder, and ultrasonic waves were applied for uniform dispersion over 10 minutes. To this, 30.8 g of the above liquid composition was added, and 112 g of ethanol was further added to obtain a coating liquid for forming a catalyst layer having a solid content of 10 mass %. The coating liquid for forming a catalyst layer was applied on an ethylene-tetrafluoroethylene copolymer sheet, dried at 80° C., and further heat-treated at 160° C. for 30 minutes to prepare an anode catalyst layer sheet having a platinum content of 0.4 mg/cm$^2$.

On the surface of the previously obtained electrolyte membrane with a cathode catalyst layer on which the cathode catalyst layer did not exist, the surface of the anode catalyst layer sheet on which the anode catalyst layer existed, was overlaid, followed by heat pressing under pressing conditions of 130° C. for 5 minutes at 1.5 MPa to bond the anode catalyst layer to the electrolyte membrane, and the ethylene-tetrafluoroethylene copolymer sheet was peeled off to obtain a membrane catalyst layer assembly having an electrode area of 25 cm$^2$.

The membrane catalyst layer assembly was sandwiched between a gas diffusion base material for an anode (manufactured by NOK, trade name: X0086 IX92 CX320) and a gas diffusion base material for a cathode (manufactured by NOK, trade name: H2315 T10X6 CX96) to obtain a membrane electrode assembly. The gas diffusion base material had a carbon layer composed of carbon particles and PTFE on one surface thereof, and the carbon layer was disposed so as to be in contact with the catalyst layer of the membrane catalyst layer assembly. The prepared membrane electrode assembly was incorporated into a cell for power generation, and the cell voltage was measured by the above-mentioned test for initial power generation characteristics. The results are shown in Table 3.

Ex. 10-2

A membrane electrode assembly was obtained in the same manner as in Ex. 10-1 except that the liquid composition S-3 was used as the cathode catalyst layer coating liquid and the amounts of the liquid composition and the solvent added were adjusted so that the composition of the cathode catalyst layer coating liquid did not change. The prepared membrane electrode assembly was incorporated into a cell for power generation, and the cell voltage was measured by the above-mentioned test for initial power generation characteristics. The results are shown in Table 3.

Ex. 11

A membrane electrode assembly was obtained in the same manner as in Example 10-1 except that the liquid composition S-4 was used as the cathode catalyst layer coating liquid and the amounts of the liquid composition and the solvent added were adjusted so that the composition of the cathode catalyst layer coating liquid did not change. The prepared membrane electrode assembly was incorporated into a cell for power generation, and the cell voltage was measured by the above-mentioned test for initial power generation characteristics. The results are shown in Table 3.

TABLE 3

| | Ex. 10-1 | Ex. 10-2 | Ex. 11 |
| --- | --- | --- | --- |
| Liquid composition used for cathode catalyst layer | S-2 | S-3 | S-4 |
| Cell voltage [V] | 0.562 | 0.546 | 0.514 |

INDUSTRIAL APPLICABILITY

The polymer of the present invention is useful as a polymer to be contained in a catalyst layer or a polymer electrolyte membrane in a membrane electrode assembly for a polymer electrolyte fuel cell, a catalyst layer or a polymer electrolyte membrane in a membrane electrode assembly for a polymer electrolyte water electrolysis, a cation exchange membrane to be used for an chlor-alkali electrolysis or electrodialysis, an ion exchange membrane to be used for water electrolysis, a separator for a redox flow secondary battery, an ion exchange membrane for an electrochemical hydrogen pump, a solid acid catalyst, a gas separation membrane, an antistatic coating, an antistatic film, a solid phase fluorinating agent, etc.

REFERENCE SYMBOLS

10: Membrane electrode assembly, 11: catalyst layer, 12: gas diffusion layer, 13: anode, 14: cathode, 15: polymer electrolyte membrane, 16: carbon layer.

What is claimed is:

1. A polymer having either one or both of units represented by the following formula u1-1 and units represented by the following formula u1-2:

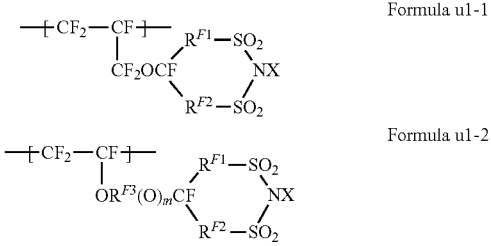

Formula u1-1

Formula u1-2 where $R^{F1}$ and $R^{F2}$ are each independently a $C_{1-3}$ perfluoroalkylene group, $R^{F3}$ is a $C_{1-6}$ perfluoroalkylene group, m is 0 or 1, and X is a hydrogen atom, an alkali metal, a fluorine atom, a $C_{1-10}$ alkyl group, a group having an etheric oxygen atom between carbon atoms of a $C_{2-10}$ alkyl group, ammonium or phosphonium.

2. The polymer according to claim 1, which further has units based on tetrafluoroethylene.

3. A liquid composition comprising the polymer as defined in claim 1 and a liquid medium.

4. A membrane comprising the polymer as defined in claim 1.

5. The membrane according to claim 4, which further contains a reinforcing material.

6. A method for producing a membrane, which comprises applying the liquid composition as defined in claim 3 to a base material or impregnating it to a reinforcing material, followed by drying.

7. A polymer electrolyte membrane comprising the polymer as defined in claim 1.

8. A catalyst layer comprising the polymer as defined in claim 1 and a catalyst.

9. A membrane electrode assembly for a polymer electrolyte fuel cell, comprising an anode having a catalyst layer, a cathode having a catalyst layer, and a polymer electrolyte membrane disposed between the anode and the cathode, in which at least one selected from the group consisting of the catalyst layer of the cathode, the catalyst layer of the anode, and the polymer electrolyte membrane, contains the polymer as defined in claim 1.

10. A polymer electrolyte fuel cell provided with the membrane electrode assembly as defined in claim 9.

11. A method for producing a polymer, which comprises reacting polymer F having units represented by the following formula u2 with ammonia to obtain polymer Ia having units represented by the following formula u1a:

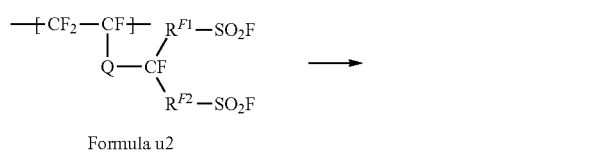

Formula u2

Formula u1a where $R^{F1}$ and $R^{F2}$ are each independently a $C_{1-3}$ perfluoroalkylene group, Q is —O— or —(O)$_n$R$^f$(O)$_m$—, R$^f$ is a $C_{1-10}$ fluoroalkylene group or a group having an etheric oxygen atom between carbon atoms of a $C_{2-10}$ fluoroalkylene group, m is 0 or 1, and n is 0 or 1.

12. A method for producing a polymer, which comprises reacting the polymer Ia obtained by the method for producing a polymer as defined in claim 11, with a protonic acid, to obtain polymer Ib having units represented by the following formula u1b:

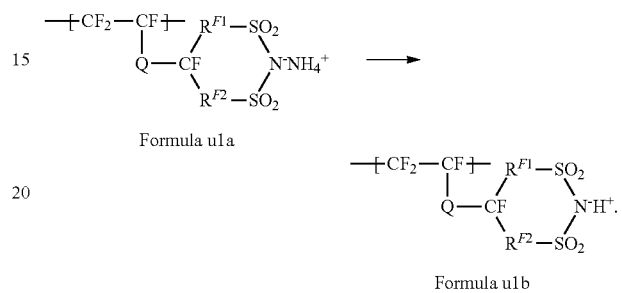

Formula u1a

Formula u1b

13. A method for producing a polymer, which comprises reacting the polymer Ia obtained by the method for producing a polymer as defined in claim 11, with an alkali metal salt, to obtain polymer Ic represented by the following formula u1c:

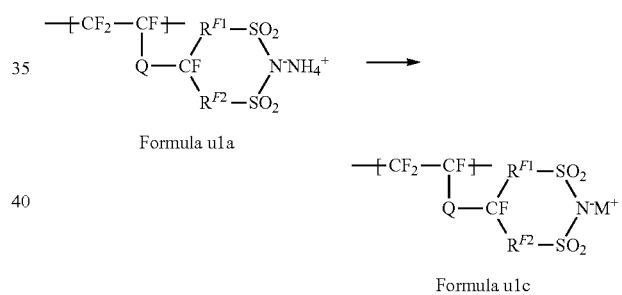

Formula u1a

Formula u1c where M is an alkali metal;

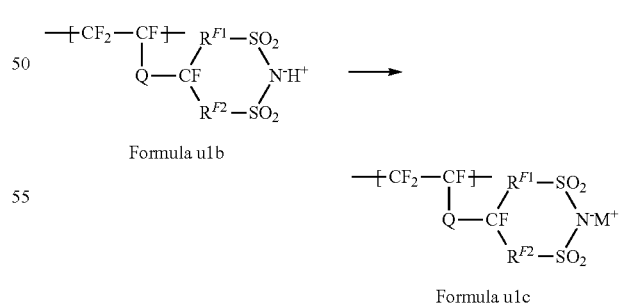

Formula u1b

Formula u1c where M is an alkali metal.

14. A method for producing a polymer, which comprises reacting the polymer Ic obtained by the method for producing a polymer as defined in claim 13, with molecular fluorine, to obtain polymer Id having units represented by the following formula u1d:

Formula u1b $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N^-H^+ \longrightarrow$$

Formula u1d $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!NF$$

Formula u1c $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N^-M^+ \longrightarrow$$

Formula u1d $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!NF.$$

15. A method for producing a polymer, which comprises reacting the polymer Ib obtained by the method for producing a polymer as defined in claim 12, with an alkylating agent having a $R^{10}$ group, to obtain a polymer Ie having units represented by the following formula u1e:

Formula u1b $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N^-H^+ \longrightarrow$$

Formula u1e $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!NR^{10}$$

where $R^{10}$ is a $C_{1\text{-}10}$ alkyl group, or a group having an etheric oxygen atom between carbon atoms of a $C_{2\text{-}10}$ alkyl group.

16. A method for producing a polymer, which comprises reacting the polymer Ib obtained by the method for producing a polymer as defined in claim 12, with a compound represented by the following formula 11, to obtain polymer If having units represented by the following formula u1f:

$$[Z^+(R^{11})(R^{12})(R^{13})(R^{14})]_k(A)^{k-} \qquad \text{Formula 11}$$

Formula u1b $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N^-H^+ \longrightarrow$$

Formula u1f $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N\text{-}R^{14}\!\!-\!\!\begin{array}{c}R^{11}\\ |\\ Z^+\!\!-\!\!R^{12}\\ |\\ R^{13}\end{array}$$

where Z is a nitrogen atom or a phosphorus atom, and $R^{11}$ to $R^{14}$ are each independently a hydrogen atom, a $C_{1\text{-}10}$ alkyl group, or a group having an etheric oxygen atom between carbon atoms of a $C_{2\text{-}10}$ alkyl group, or $R^{11}$ and $R^{12}$ may form a ring, A may be a k-valent anion, and k may be 1 or 2.

17. A method for producing a polymer, which comprises reacting the polymer Ie obtained by the method for producing a polymer as defined in claim 15 with a compound represented by the following formula 12, to obtain polymer Ig having units represented by the following formula u1g:

$$Z(R^{11})(R^{12})(R^{13}) \qquad \text{Formula 12}$$

Formula u1e $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!NR^{10} \longrightarrow$$

Formula u1g $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N\text{-}R^{10}\!\!-\!\!\begin{array}{c}R^{11}\\ |\\ Z^+\!\!-\!\!R^{12}\\ |\\ R^{13}\end{array}$$

where Z is a nitrogen atom or a phosphorus atom, and $R^{11}$ to $R^{13}$ are each independently a hydrogen atom, a $C_{1\text{-}10}$ alkyl group, or a group having an etheric oxygen atom between carbon atoms of a $C_{2\text{-}10}$ alkyl group, or $R^{11}$ and $R^{12}$ may form a ring.

18. The method for producing a polymer according to claim 11, wherein Q is —$CF_2O$—, —$OR^{F3}(O)_m$— (where $R^{F3}$ is a $C_{1\text{-}6}$ perfluoroalkylene group) or —O—.

19. The method for producing a polymer according to claim 11, wherein the polymer F further has units based on tetrafluoroethylene.

20. A method for producing a membrane, which comprises extrusion-molding polymer F having units represented by the following formula u2 into a membrane shape, and then reacting the polymer F with ammonia to obtain a membrane comprising polymer Ia having units represented by the following formula u1a:

Formula u2

$$-\!\!\!+\!\!CF_2-\!\!CF\!\!+\!\!-\!\!\begin{array}{c}R^{F1}-SO_2F\\ |\\ Q-CF\\ \backslash\\ R^{F2}-SO_2F\end{array} \longrightarrow$$

Formula u1a $$-\!\!\!+\!\!CF_2-\!\!CF\!\!+\!\!-\!\!\begin{array}{c}R^{F1}-SO_2\\ |\\ Q-CF\\ \backslash\\ R^{F2}-SO_2\end{array}\!\!\!N^-NH_4^+$$

where $R^{F1}$ and $R^{F2}$ are each independently a $C_{1-3}$ perfluoroalkylene group, Q is —O— or —$(O)_nR'(O)_m$—, $R'$ is a $C_{1-10}$ fluoroalkylene group or a group having an etheric oxygen atom between carbon atoms of a $C_{2-10}$ fluoroalkylene group, m is 0 or 1, and n is 0 or 1.

21. The polymer according to claim 1, wherein a proportion of either one or both of the units represented by the formula u1-1 and the units represented by the formula u1-2, among all units constituting the polymer, is from 5.0 to 35.0 mol %.

22. The polymer according to claim 1, wherein:
a proportion of either one or both of the units represented by the formula u1-1 and the units represented by the formula u1-2, among all units constituting the polymer, is from 5.0 to 35.0 mol %;
the polymer further has units based on tetrafluoroethylene; and
a proportion of the units based on tetrafluoroethylene, among all units constituting the polymer, is from 65.0 to 95.0 mol %.

* * * * *